(12) United States Patent
Dorsey et al.

(10) Patent No.: US 12,724,830 B2
(45) **Date of Patent: *Sep. 1, 2026**

(54) QUERYING ACROSS DIFFERENT LOG DATA SOURCE TYPES

(71) Applicant: Crogl, Inc., Los Ranchos, NM (US)

(72) Inventors: David M. Dorsey, Pflugerville, TX (US); Munawar M. Merza, Los Ranchos, NM (US)

(73) Assignee: Crogl, Inc., Los Ranchos, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/079,408

(22) Filed: Mar. 13, 2025

(65) Prior Publication Data

US 2026/0017322 A1 Jan. 15, 2026

Related U.S. Application Data

(63) Continuation of application No. 18/773,570, filed on Jul. 15, 2024, now Pat. No. 12,277,177.

(51) Int. Cl.

*G06F 16/9032* (2019.01)
*G06F 16/901* (2019.01)
*G06F 16/9038* (2019.01)
*G06F 16/906* (2019.01)

(52) U.S. Cl.

CPC ...... *G06F 16/9032* (2019.01); *G06F 16/9024* (2019.01); *G06F 16/9038* (2019.01); *G06F 16/906* (2019.01)

(58) Field of Classification Search

CPC ............ G06F 16/9032; G06F 16/9024; G06F 16/9038; G06F 16/906

See application file for complete search history.

(56) References Cited

PUBLICATIONS

International Search Report and Written Opinion, PCT App. No. PCT/US2025/037793, Sep. 10, 2025, 09 pages.

*Primary Examiner* — Charles Rones
*Assistant Examiner* — Xiaoqin Hu
(74) *Attorney, Agent, or Firm* — Nicholson De Vos Webster & Elliott LLP

(57) ABSTRACT

A system may attempt to classify, according to field types, label fields used by structures in instances of different log data source types, which use different structure types and different path information to access the structures of those structure types within the instances. Each of the structures includes at least one of the label fields and at least one data field associated with that label field. The system may store a result that includes the path information to access the structures and mappings of at least some of the field labels to the field types. The system may determine a field type involved in a system level query, and then generate a set of query graphs based on the field type and the result. The system may generate a set of instance level queries for a set of the instances according to the set of query graphs.

26 Claims, 21 Drawing Sheets

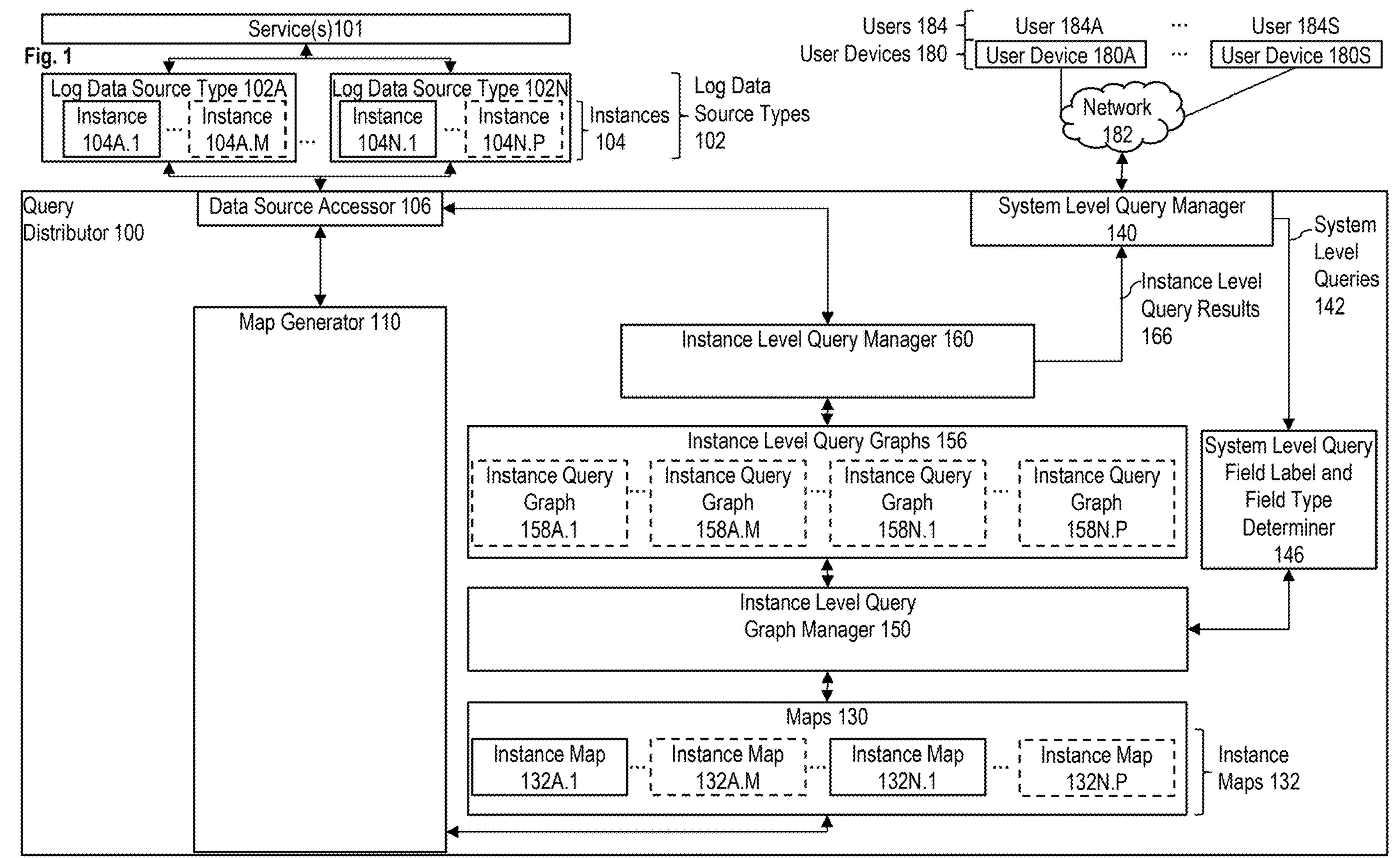
Fig. 1
Service(s)101
Log Data Source Type 102A
Instance 104A.1
Instance 104A.M
Log Data Source Type 102N
Instance 104N.1
Instance 104N.P
Instances 104
Log Data Source Types 102
Users 184
User Devices 180
User 184A
User Device 180A
User 184S
User Device 180S
Network 182
Query Distributor 100
Data Source Accessor 106
System Level Query Manager 140
System Level Queries 142
Instance Level Query Results 166
Map Generator 110
Instance Level Query Manager 160
Instance Level Query Graphs 156
Instance Query Graph 158A.1
Instance Query Graph 158A.M
Instance Query Graph 158N.1
Instance Query Graph 158N.P
System Level Query Field Label and Field Type Determiner 146
Instance Level Query Graph Manager 150
Maps 130
Instance Map 132A.1
Instance Map 132A.M
Instance Map 132N.1
Instance Map 132N.P
Instance Maps 132

| Log Data Source Type | Structure Type | Path Information (How to access the structures) | Field Label (contents of Label Field Storage) | Storage for Label Field (Label Field Storage) | Storage for Data Field (Data Field Storage) | Data Field Data or just Data (contents of Data Field Storage) |
|---|---|---|---|---|---|---|
| Relational Database/ SQL | Table | database name:table name | Column name (which is part of the table's schema) | That part of the storage for the column name of the table's schema | Cell | data in Cell |
| JSON | Key-Value Pair | Key Fields of Key-Value Pairs | keys in Key Fields | Key Fields of Key-Value Pairs | Value Fields of the Key Value-Pairs | data in Value Field |
| Splunk | Sourcetype/Additional Filter | Index: Sourcetype:<AdditionalFilter> Name Field | name in Name Field | Name Field | Value Field | data in Value Field |
| Cribl | dataset | dataset:Name Field | name in Name Field | Name Field | Value Field | data in Value Field |
| Log Analytics | Table | | name in Name Field | Name Field | Value Field | data in Value Field |
| CrowdStrike Falcon | API Command | API Endpoint | name in Name Field | Name Field | Value Field | data in Value Field |

Fig. 2B

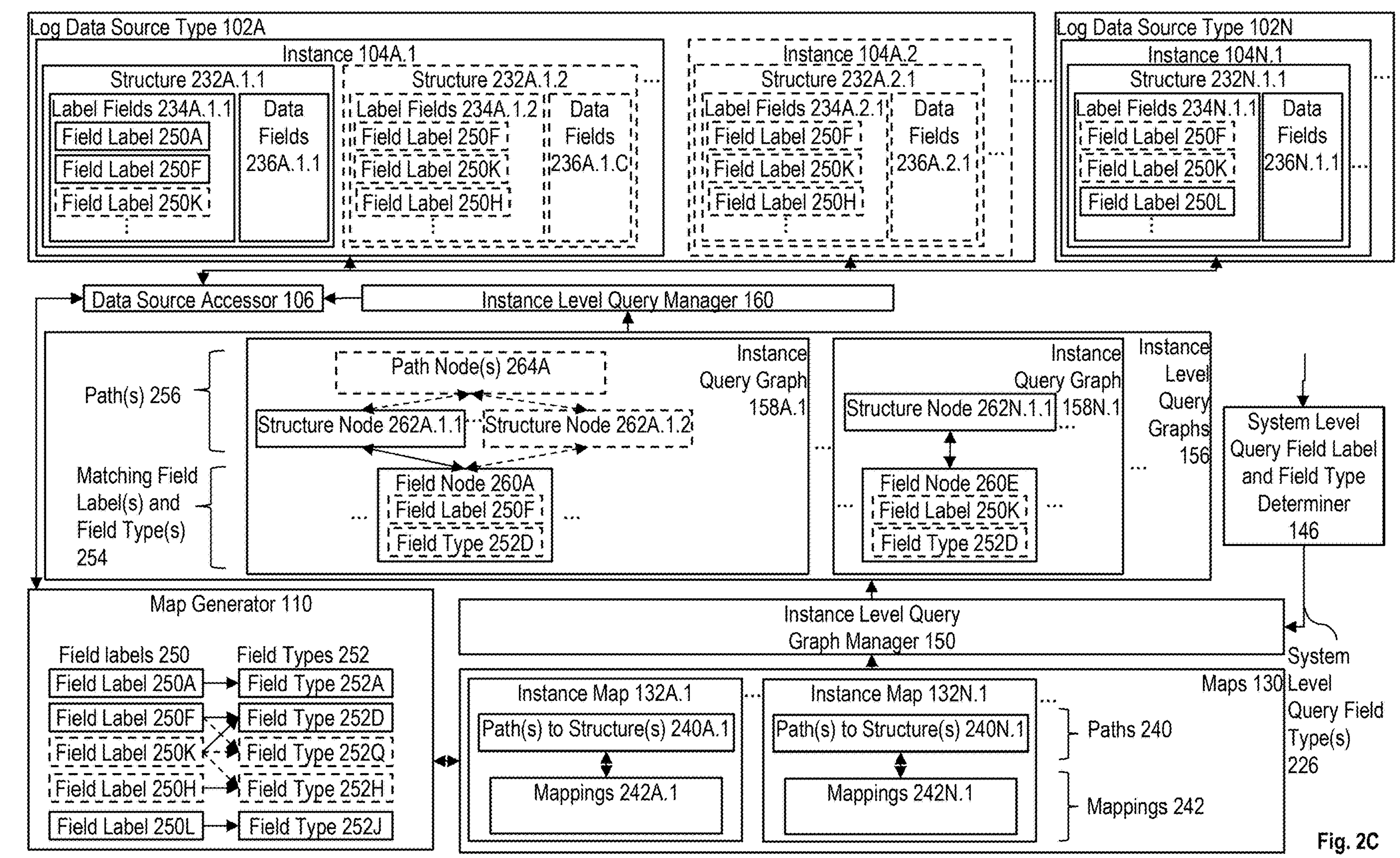
Log Data Source Type 102A
Instance 104A.1
Structure 232A.1.1
Label Fields 234A.1.1
Field Label 250A
Field Label 250F
Field Label 250K
Data Fields 236A.1.1
Structure 232A.1.2
Label Fields 234A.1.2
Field Label 250F
Field Label 250K
Field Label 250H
Data Fields 236A.1.C
Instance 104A.2
Structure 232A.2.1
Label Fields 234A.2.1
Field Label 250F
Field Label 250K
Field Label 250H
Data Fields 236A.2.1
Log Data Source Type 102N
Instance 104N.1
Structure 232N.1.1
Label Fields 234N.1.1
Field Label 250F
Field Label 250K
Field Label 250L
Data Fields 236N.1.1
Data Source Accessor 106
Instance Level Query Manager 160
Path(s) 256
Matching Field Label(s) and Field Type(s) 254
Path Node(s) 264A
Instance Query Graph 158A.1
Structure Node 262A.1.1
Structure Node 262A.1.2
Field Node 260A
Field Label 250F
Field Type 252D
Instance Query Graph 158N.1
Structure Node 262N.1.1
Field Node 260E
Field Label 250K
Field Type 252D
Instance Level Query Graphs 156
System Level Query Field Label and Field Type Determiner 146
Map Generator 110
Field labels 250
Field Types 252
Field Label 250A
Field Type 252A
Field Label 250F
Field Type 252D
Field Label 250K
Field Type 252Q
Field Label 250H
Field Type 252H
Field Label 250L
Field Type 252J
Instance Level Query Graph Manager 150
System Level Query Field Type(s) 226
Maps 130
Instance Map 132A.1
Path(s) to Structure(s) 240A.1
Mappings 242A.1
Instance Map 132N.1
Path(s) to Structure(s) 240N.1
Mappings 242N.1
Paths 240
Mappings 242
Fig. 2C

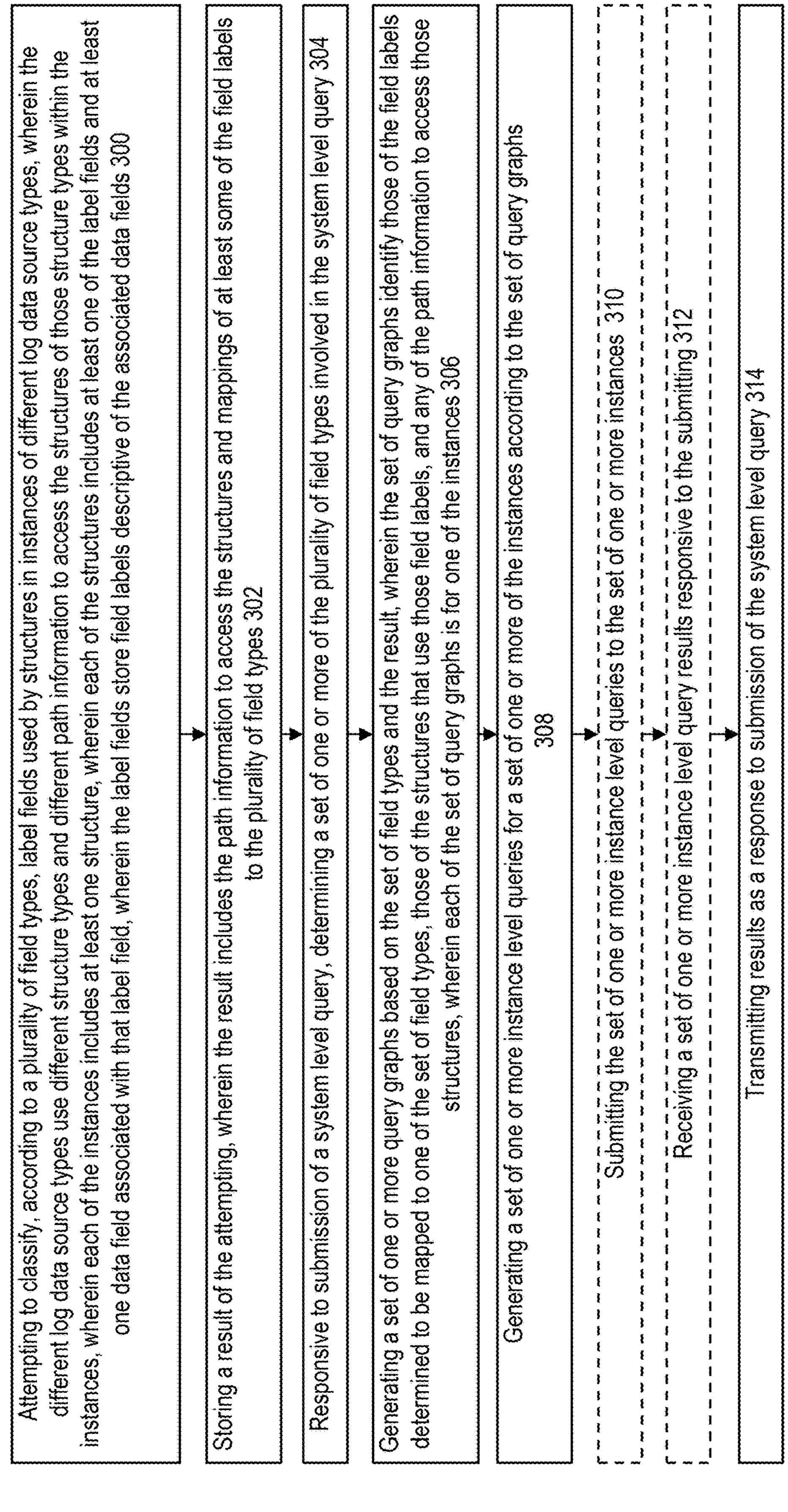
Attempting to classify, according to a plurality of field types, label fields used by structures in instances of different log data source types, wherein the different log data source types use different structure types and different path information to access the structures of those structure types within the instances, wherein each of the instances includes at least one structure, wherein each of the structures includes at least one of the label fields and at least one data field associated with that label field, wherein the label fields store field labels descriptive of the associated data fields 300
Storing a result of the attempting, wherein the result includes the path information to access the structures and mappings of at least some of the field labels to the plurality of field types 302
Responsive to submission of a system level query, determining a set of one or more of the plurality of field types involved in the system level query 304
Generating a set of one or more query graphs based on the set of field types and the result, wherein the set of query graphs identify those of the field labels determined to be mapped to one of the set of field types, those of the structures that use those field labels, and any of the path information to access those structures, wherein each of the set of query graphs is for one of the instances 306
Generating a set of one or more instance level queries for a set of one or more of the instances according to the set of query graphs 308
Submitting the set of one or more instance level queries to the set of one or more instances 310
Receiving a set of one or more instance level query results responsive to the submitting 312
Transmitting results as a response to submission of the system level query 314
Fig. 3

Fig. 6

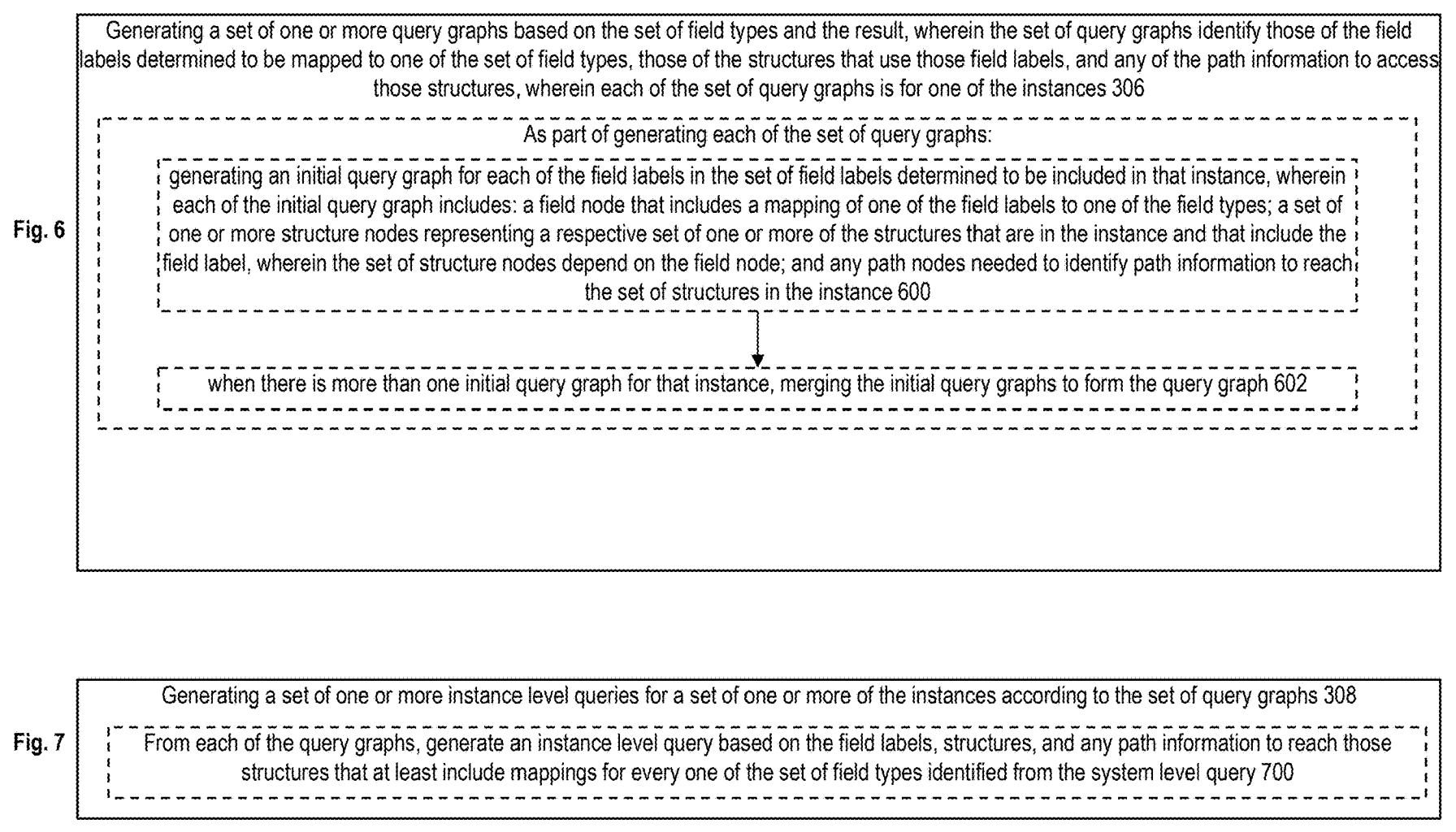

Generating a set of one or more query graphs based on the set of field types and the result, wherein the set of query graphs identify those of the field labels determined to be mapped to one of the set of field types, those of the structures that use those field labels, and any of the path information to access those structures, wherein each of the set of query graphs is for one of the instances 306

As part of generating each of the set of query graphs:

generating an initial query graph for each of the field labels in the set of field labels determined to be included in that instance, wherein each of the initial query graph includes: a field node that includes a mapping of one of the field labels to one of the field types; a set of one or more structure nodes representing a respective set of one or more of the structures that are in the instance and that include the field label, wherein the set of structure nodes depend on the field node; and any path nodes needed to identify path information to reach the set of structures in the instance 600 when there is more than one initial query graph for that instance, merging the initial query graphs to form the query graph 602

Fig. 7

Generating a set of one or more instance level queries for a set of one or more of the instances according to the set of query graphs 308

From each of the query graphs, generate an instance level query based on the field labels, structures, and any path information to reach those structures that at least include mappings for every one of the set of field types identified from the system level query 700

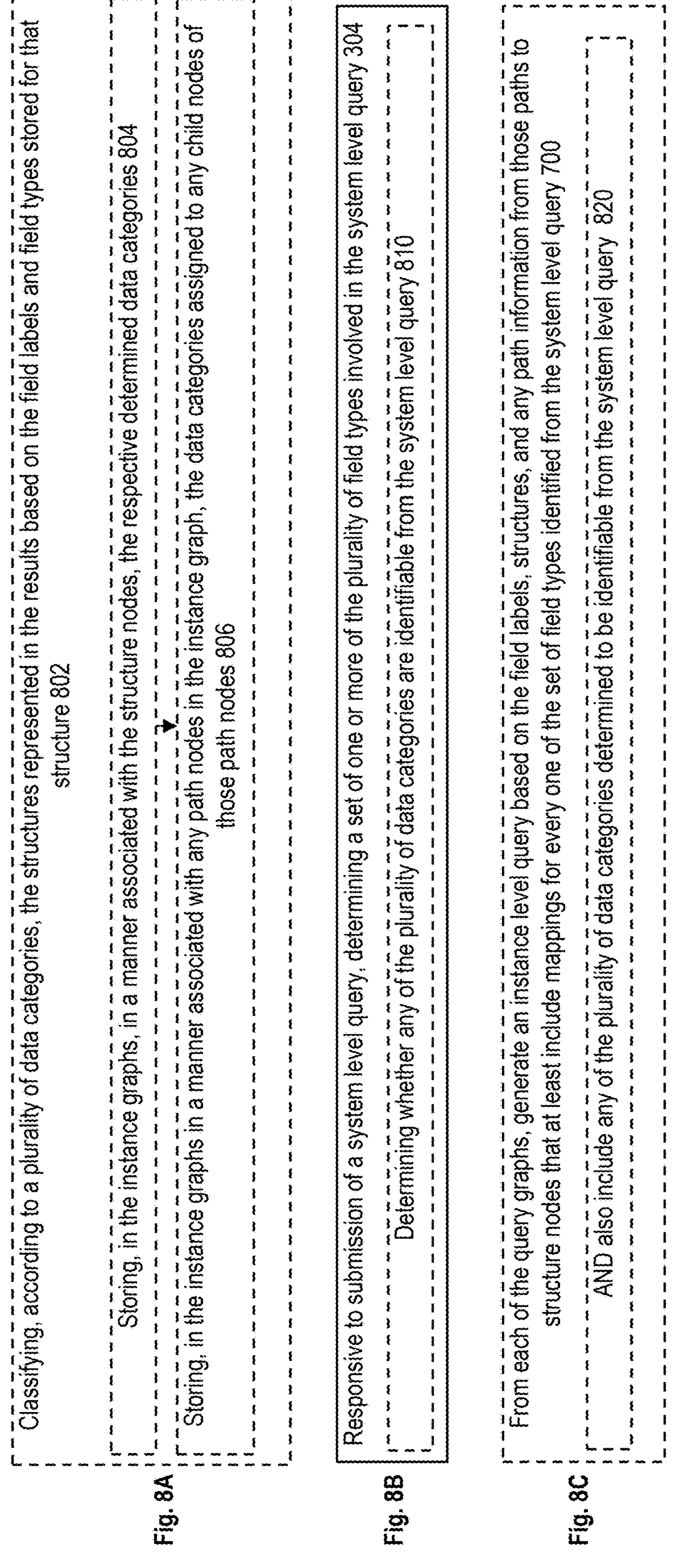
Fig. 8A
Classifying, according to a plurality of data categories, the structures represented in the results based on the field labels and field types stored for that structure 802
Storing, in the instance graphs, in a manner associated with the structure nodes, the respective determined data categories 804
Storing, in the instance graphs in a manner associated with any path nodes in the instance graph, the data categories assigned to any child nodes of those path nodes 806
Fig. 8B
Responsive to submission of a system level query, determining a set of one or more of the plurality of field types involved in the system level query 304
Determining whether any of the plurality of data categories are identifiable from the system level query 810
Fig. 8C
From each of the query graphs, generate an instance level query based on the field labels, structures, and any path information from those paths to structure nodes that at least include mappings for every one of the set of field types identified from the system level query 700
AND also include any of the plurality of data categories determined to be identifiable from the system level query 820

Fig. 10A

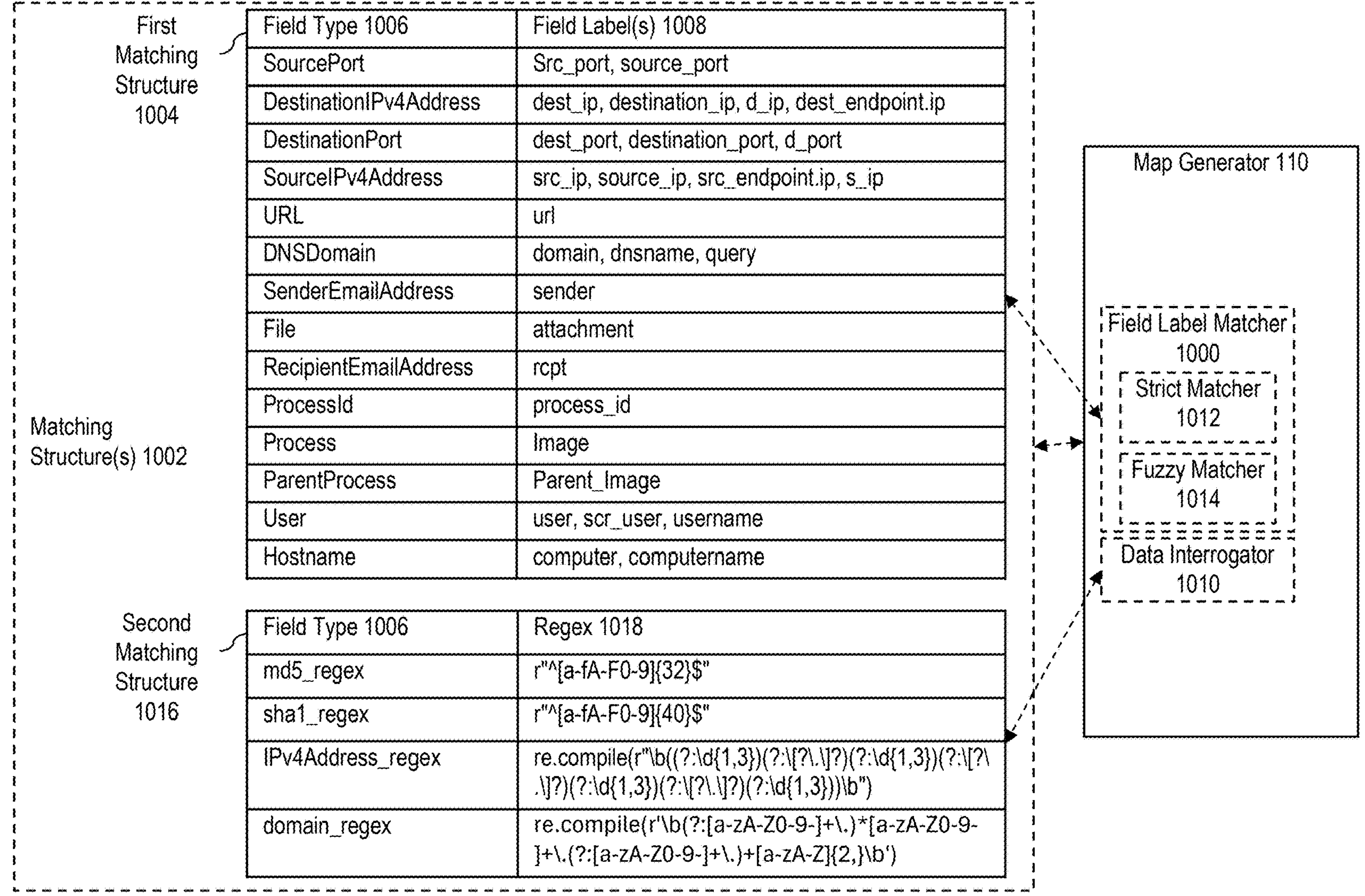

| Field Type 1006 | Field Label(s) 1008 |
|---|---|
| SourcePort | Src_port, source_port |
| DestinationIPv4Address | dest_ip, destination_ip, d_ip, dest_endpoint.ip |
| DestinationPort | dest_port, destination_port, d_port |
| SourceIPv4Address | src_ip, source_ip, src_endpoint.ip, s_ip |
| URL | url |
| DNSDomain | domain, dnsname, query |
| SenderEmailAddress | sender |
| File | attachment |
| RecipientEmailAddress | rcpt |
| ProcessId | process_id |
| Process | Image |
| ParentProcess | Parent_Image |
| User | user, scr_user, username |
| Hostname | computer, computername |

| Field Type 1006 | Regex 1018 |
|---|---|
| md5_regex | r"^[a-fA-F0-9]{32}$" |
| sha1_regex | r"^[a-fA-F0-9]{40}$" |
| IPv4Address_regex | re.compile(r"\b((?:\d{1,3})(?:\[?\.\]?)(?:\d{1,3})(?:\[?\.\]?)(?:\d{1,3})(?:\[?\.\]?)(?:\d{1,3}))\b") |
| domain_regex | re.compile(r'\b(?:[a-zA-Z0-9-]+\.)*[a-zA-Z0-9-]+\.(?:[a-zA-Z0-9-]+\.)+[a-zA-Z]{2,}\b') |

Fig. 11A

| Fields \ Rolls of Nodes | Root Node/ Level 1 Path Node | Intermediate Node/ Level N Path Node | Last Level Path Node/ Structure Node | Root Node AND Last Level Data Path Node/ Structure Node | Leaf Node/Field Node |
|---|---|---|---|---|---|
| Name: | Name chosen for that level of the data path (this is based on what this instance of the log data source uses for this) | | | Name chosen for that level of the data path (this is based on what this instance of the log data source uses for this); here, the name of the structure | Field Label used in the structure of the instance of the log data source |
| Type: | Term for this level in the path (this is based on the log data source type) | | | Term for the first level in the path (this is based on the log data source type) | Field Type determined by the matching logic (strict, fuzzy, or data interrogation) |
| Data Category | List of data categories assigned to all descendants in instance graph | | | Data Category assigned | NA |
| Node Role: | Indicator of the node's role | | | | |
| Id: | Unique ID within the graph | | | | |

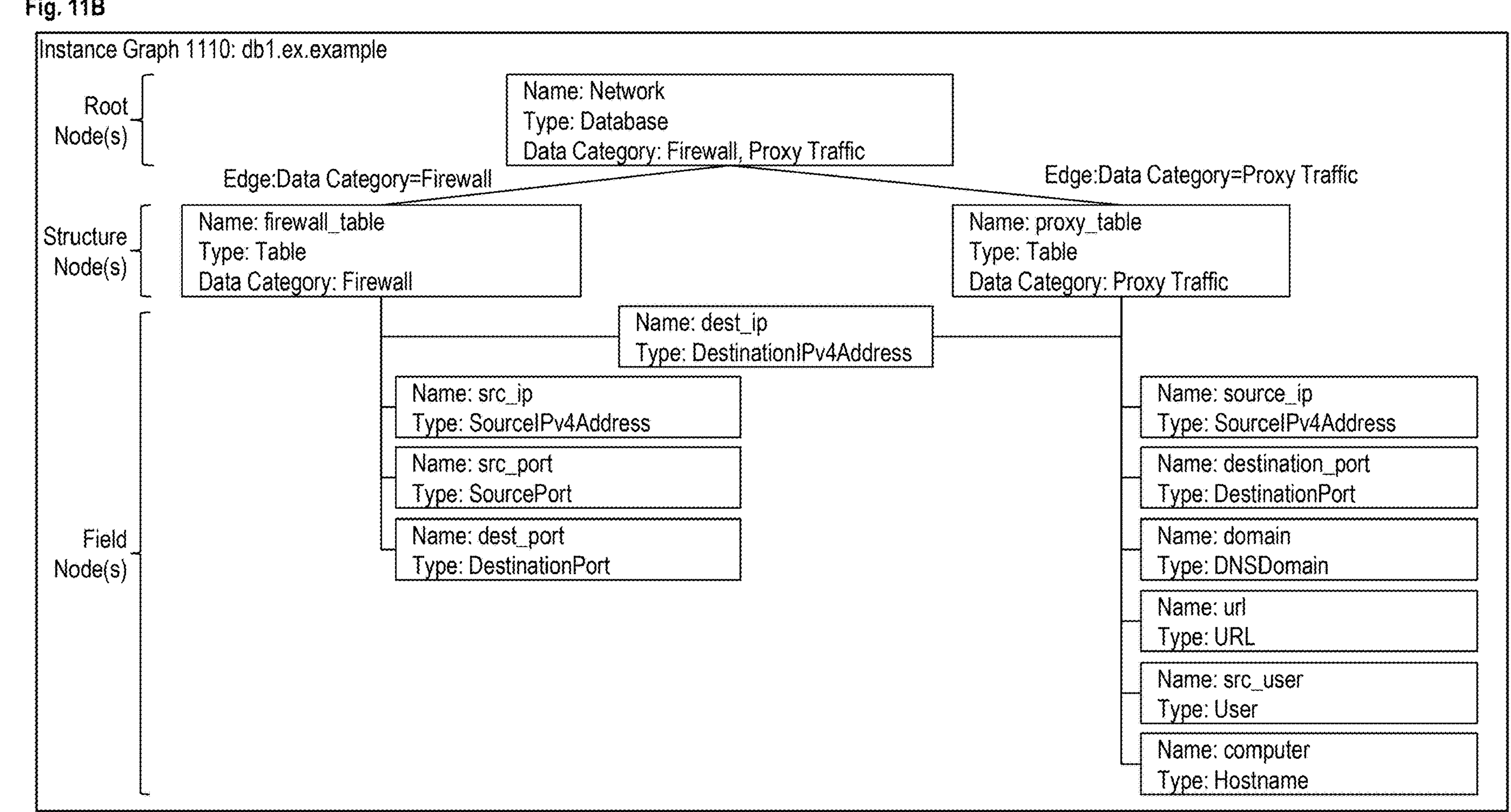
Fig. 11B
Instance Graph 1110: db1.ex.example
Root Node(s)
Name: Network
Type: Database
Data Category: Firewall, Proxy Traffic
Edge:Data Category=Firewall
Edge:Data Category=Proxy Traffic
Structure Node(s)
Name: firewall_table
Type: Table
Data Category: Firewall
Name: proxy_table
Type: Table
Data Category: Proxy Traffic
Name: dest_ip
Type: DestinationIPv4Address
Field Node(s)
Name: src_ip
Type: SourceIPv4Address
Name: src_port
Type: SourcePort
Name: dest_port
Type: DestinationPort
Name: source_ip
Type: SourceIPv4Address
Name: destination_port
Type: DestinationPort
Name: domain
Type: DNSDomain
Name: url
Type: URL
Name: src_user
Type: User
Name: computer
Type: Hostname

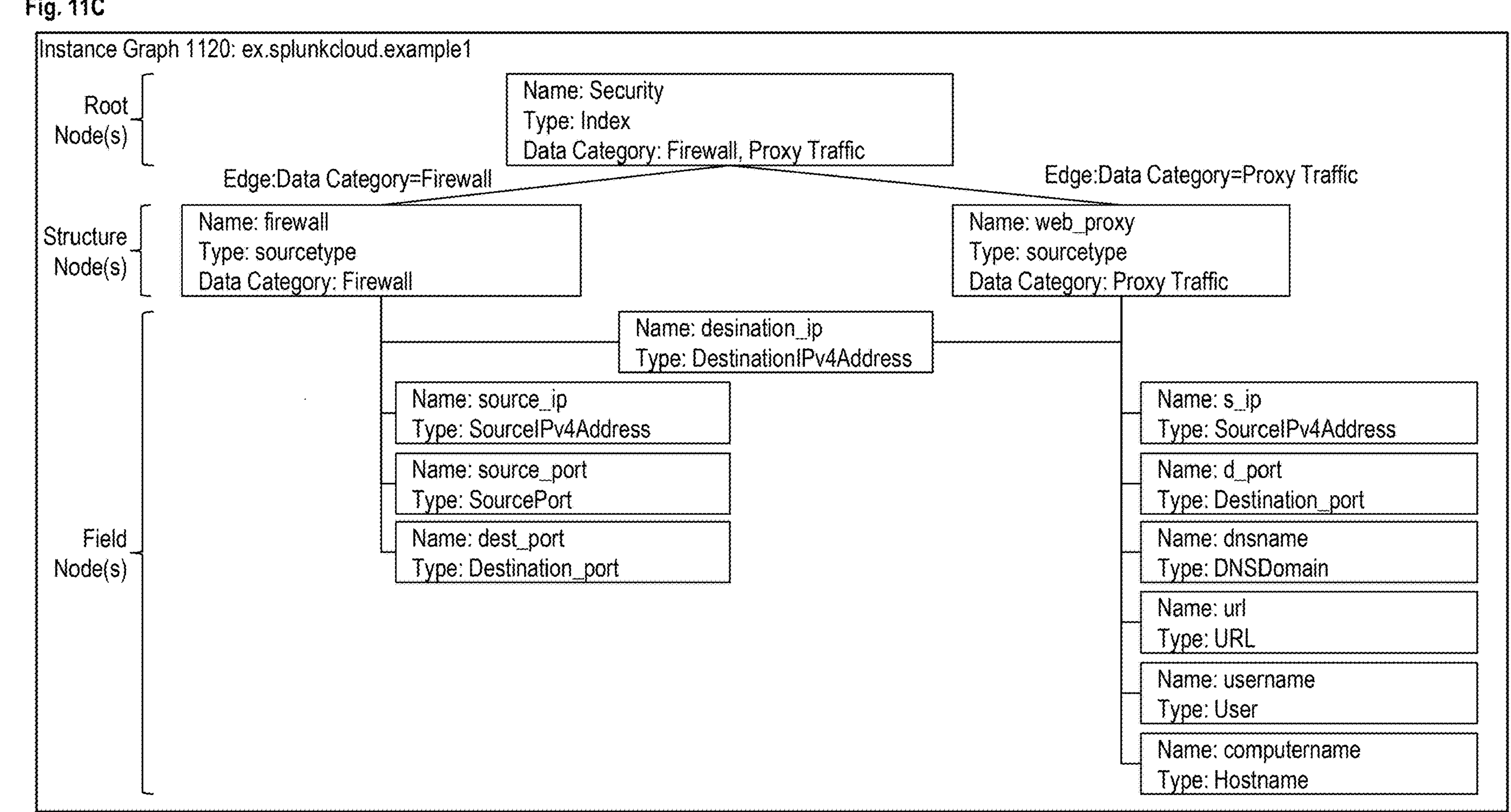

Fig. 11C
Instance Graph 1120: ex.splunkcloud.example1
Root Node(s)
Name: Security
Type: Index
Data Category: Firewall, Proxy Traffic
Edge:Data Category=Firewall
Edge:Data Category=Proxy Traffic
Structure Node(s)
Name: firewall
Type: sourcetype
Data Category: Firewall
Name: web_proxy
Type: sourcetype
Data Category: Proxy Traffic
Field Node(s)
Name: desination_ip
Type: DestinationIPv4Address
Name: source_ip
Type: SourceIPv4Address
Name: source_port
Type: SourcePort
Name: dest_port
Type: Destination_port
Name: s_ip
Type: SourceIPv4Address
Name: d_port
Type: Destination_port
Name: dnsname
Type: DNSDomain
Name: url
Type: URL
Name: username
Type: User
Name: computername
Type: Hostname

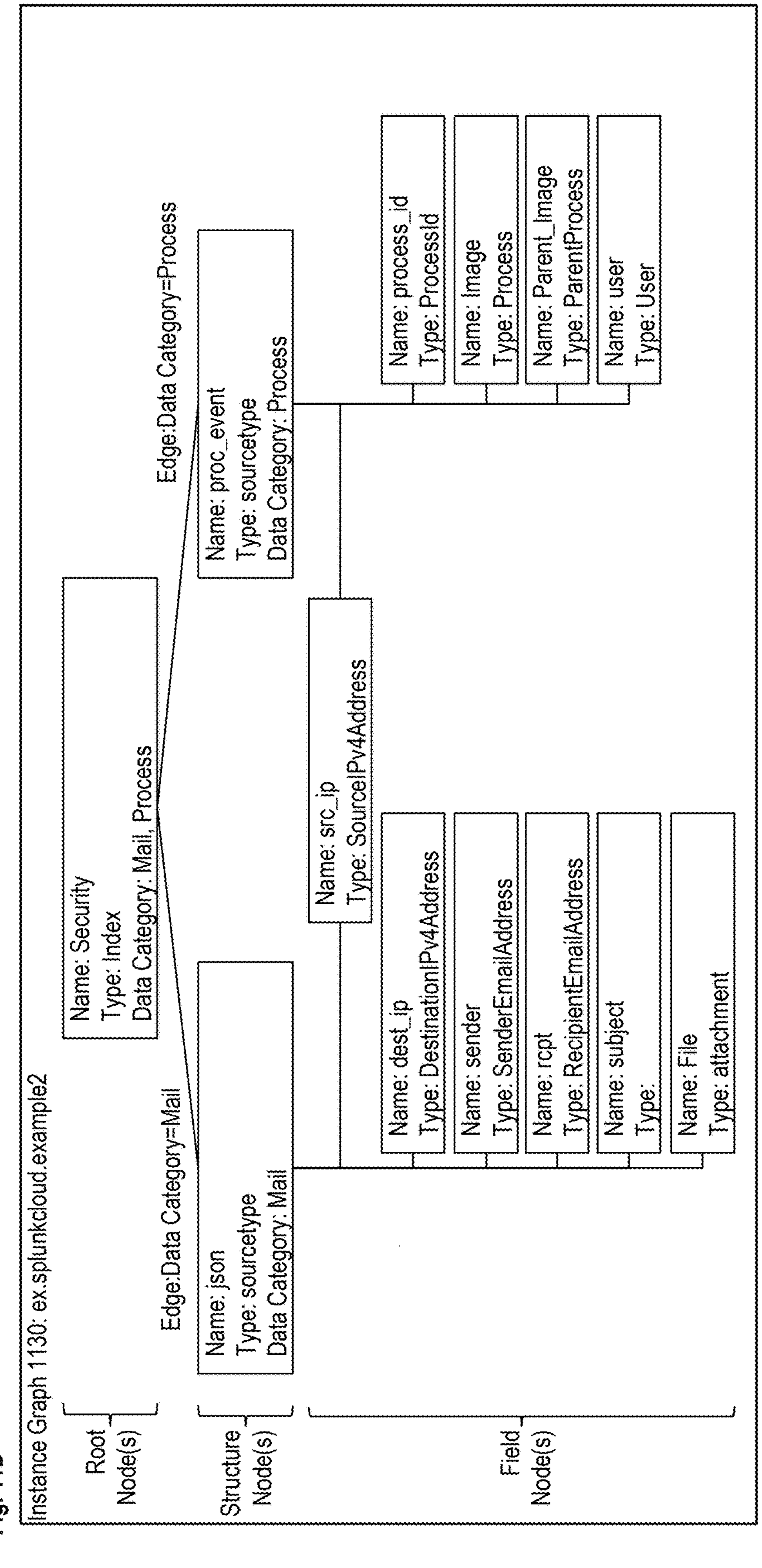
Fig. 11D
Instance Graph 1130: ex.splunkcloud.example2
Root Node(s)
Structure Node(s)
Field Node(s)
Name: Security
Type: Index
Data Category: Mail, Process
Edge:Data Category=Mail
Edge:Data Category=Process
Name: json
Type: sourcetype
Data Category: Mail
Name: proc_event
Type: sourcetype
Data Category: Process
Name: src_ip
Type: SourceIPv4Address
Name: dest_ip
Type: DestinationIPv4Address
Name: sender
Type: SenderEmailAddress
Name: rcpt
Type: RecipientEmailAddress
Name: subject
Type:
Name: File
Type: attachment
Name: process_id
Type: ProcessId
Name: Image
Type: Process
Name: Parent_Image
Type: ParentProcess
Name: user
Type: User

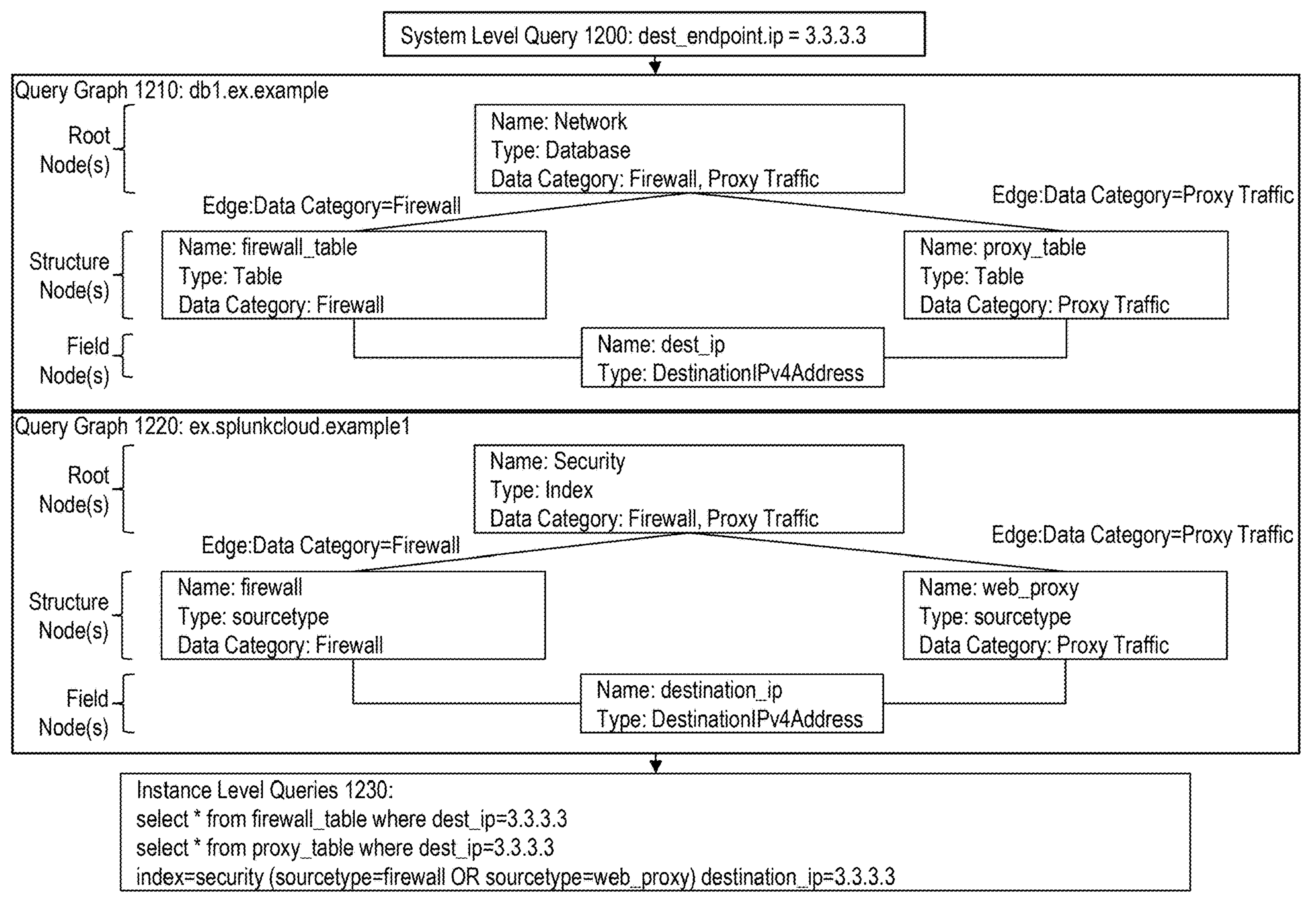
Fig. 12
System Level Query 1200: dest_endpoint.ip = 3.3.3.3
Query Graph 1210: db1.ex.example
Root Node(s)
Name: Network
Type: Database
Data Category: Firewall, Proxy Traffic
Edge:Data Category=Firewall
Edge:Data Category=Proxy Traffic
Structure Node(s)
Name: firewall_table
Type: Table
Data Category: Firewall
Name: proxy_table
Type: Table
Data Category: Proxy Traffic
Field Node(s)
Name: dest_ip
Type: DestinationIPv4Address
Query Graph 1220: ex.splunkcloud.example1
Root Node(s)
Name: Security
Type: Index
Data Category: Firewall, Proxy Traffic
Edge:Data Category=Firewall
Edge:Data Category=Proxy Traffic
Structure Node(s)
Name: firewall
Type: sourcetype
Data Category: Firewall
Name: web_proxy
Type: sourcetype
Data Category: Proxy Traffic
Field Node(s)
Name: destination_ip
Type: DestinationIPv4Address
Instance Level Queries 1230:
select * from firewall_table where dest_ip=3.3.3.3
select * from proxy_table where dest_ip=3.3.3.3
index=security (sourcetype=firewall OR sourcetype=web_proxy) destination_ip=3.3.3.3

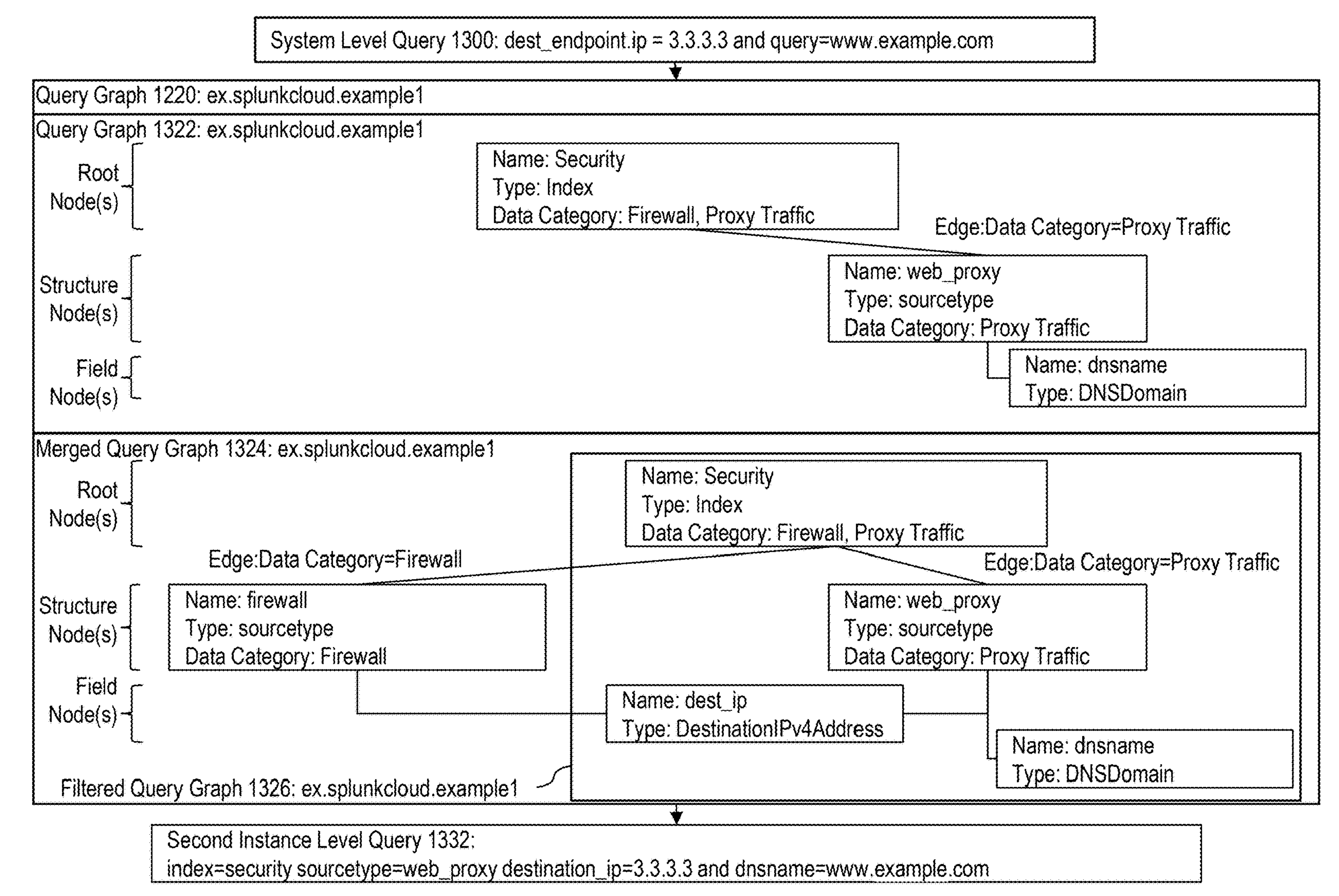
Fig. 13B
System Level Query 1300: dest_endpoint.ip = 3.3.3.3 and query=www.example.com
Query Graph 1220: ex.splunkcloud.example1
Query Graph 1322: ex.splunkcloud.example1
Root Node(s)
Structure Node(s)
Field Node(s)
Name: Security
Type: Index
Data Category: Firewall, Proxy Traffic
Edge:Data Category=Proxy Traffic
Name: web_proxy
Type: sourcetype
Data Category: Proxy Traffic
Name: dnsname
Type: DNSDomain
Merged Query Graph 1324: ex.splunkcloud.example1
Root Node(s)
Structure Node(s)
Field Node(s)
Name: Security
Type: Index
Data Category: Firewall, Proxy Traffic
Edge:Data Category=Firewall
Edge:Data Category=Proxy Traffic
Name: firewall
Type: sourcetype
Data Category: Firewall
Name: web_proxy
Type: sourcetype
Data Category: Proxy Traffic
Name: dest_ip
Type: DestinationIPv4Address
Name: dnsname
Type: DNSDomain
Filtered Query Graph 1326: ex.splunkcloud.example1
Second Instance Level Query 1332:
index=security sourcetype=web_proxy destination_ip=3.3.3.3 and dnsname=www.example.com

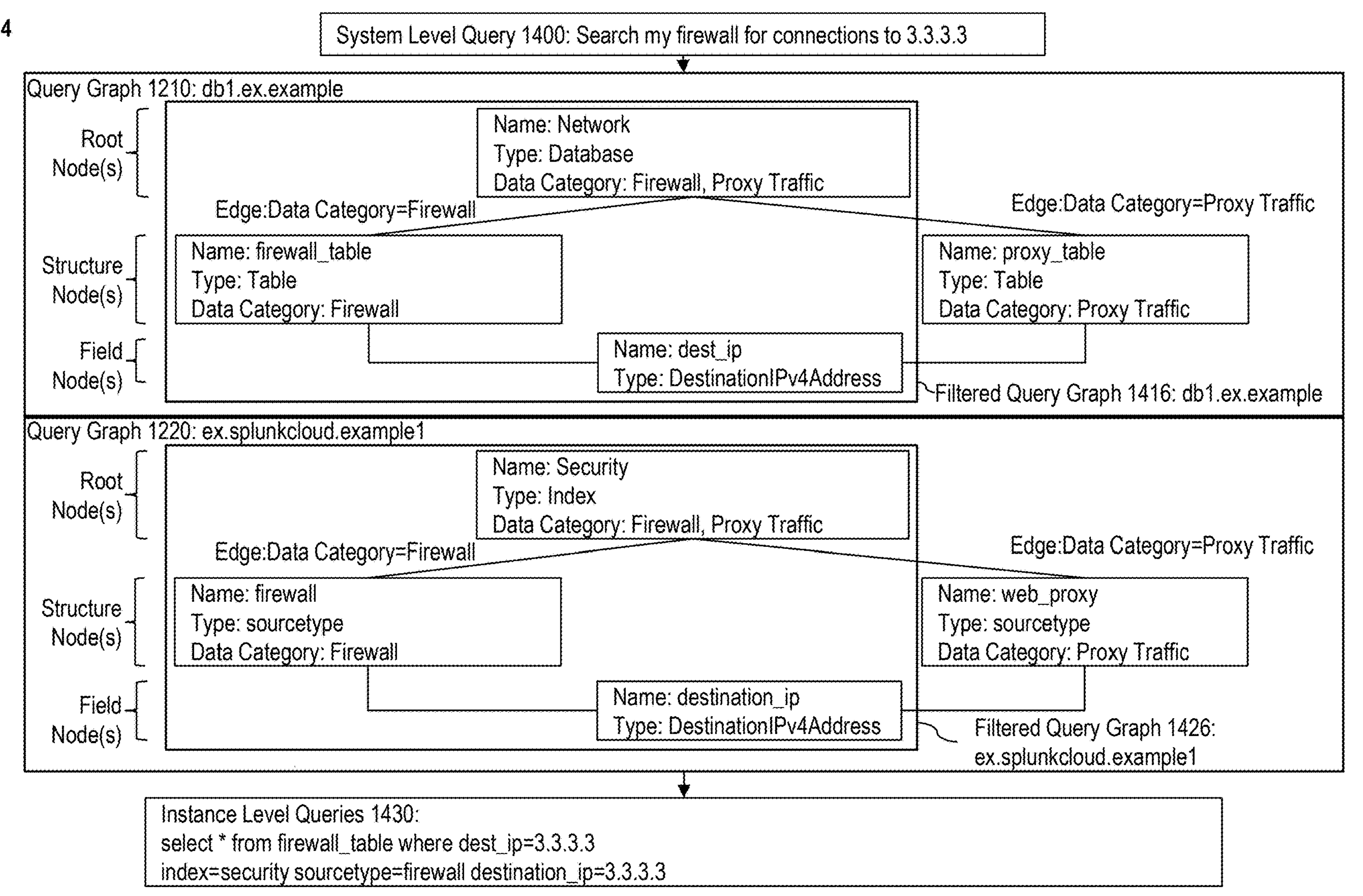
Fig. 14
System Level Query 1400: Search my firewall for connections to 3.3.3.3
Query Graph 1210: db1.ex.example
Root Node(s)
Structure Node(s)
Field Node(s)
Name: Network
Type: Database
Data Category: Firewall, Proxy Traffic
Edge:Data Category=Firewall
Edge:Data Category=Proxy Traffic
Name: firewall_table
Type: Table
Data Category: Firewall
Name: proxy_table
Type: Table
Data Category: Proxy Traffic
Name: dest_ip
Type: DestinationIPv4Address
Filtered Query Graph 1416: db1.ex.example
Query Graph 1220: ex.splunkcloud.example1
Root Node(s)
Structure Node(s)
Field Node(s)
Name: Security
Type: Index
Data Category: Firewall, Proxy Traffic
Edge:Data Category=Firewall
Edge:Data Category=Proxy Traffic
Name: firewall
Type: sourcetype
Data Category: Firewall
Name: web_proxy
Type: sourcetype
Data Category: Proxy Traffic
Name: destination_ip
Type: DestinationIPv4Address
Filtered Query Graph 1426: ex.splunkcloud.example1
Instance Level Queries 1430:
select * from firewall_table where dest_ip=3.3.3.3
index=security sourcetype=firewall destination_ip=3.3.3.3

QUERYING ACROSS DIFFERENT LOG DATA SOURCE TYPES

CROSS-REFERENCE TO RELATED APPLICATIONS

This application is a continuation of application Ser. No. 18/773,570, filed Jul. 15, 2024, which is hereby incorporated by reference.

TECHNICAL FIELD

One or more embodiments relate to the field of log data; and more specifically, to the querying log data.

DESCRIPTION OF THE RELATED ART

There are many sources (services/applications/appliances) of log data (also referred to as event data, machine data, etc.). One class of log data sources generates log data (e.g., a firewall service, a threat detection service, etc.), and these are sometimes referred to as log generators. Often, this class of sources may cause the display of the log data and/or support external access (e.g., via an application programming interface (API) or submission of queries). This class of log data sources includes various log data source types that store and/or provide external access differently, such as using different storage technologies, different schemas, different storage formats, etc.

Regarding storage technologies, a database to store log data may be implemented according to a variety of different database models, such as relational, non-relational, graph, columnar (also known as extensible record; e.g., HBase), object, tabular, tuple store, and multi-model. Examples of non-relational database models (which may also be referred to as schema-less and NoSQL database models) include key-value store and document store (also known as document-oriented as they store document-oriented information, which is also known as semi-structured data). Thus, while one log data source type may use a relational database, another may use a key-value store. Regarding schemas, in the context of a relational database the term schema refers to the names of the columns in a table (sometimes referred to as the header row). Thus, while one log data source type may use a particular schema for a table in a relational database, another log data source type may use a different schema.

While the above refers to different log data source types, the above also applies in some cases to different instances of a same one of these log data source types To provide a simple example based on a relational database, assume a particular log data source type, such as a firewall appliance from a given company, is designed to store log data in a table of a relational database. In this case, two different instances of this particular log data source (different ones of this firewall appliance from the given company) may be configured such that the schema of their respective tables are different (e.g., they have a different number of columns, at least one column in one of the tables has a different column name than any column in the other table, etc.).

Another class of log data sources collects log data from other log data sources (that is instances of different log data source types and/or different instances of a same log data source type), and these are sometimes referred to as log aggregators, log collectors, or logging services. Similar to log generators, this class of log data sources includes various log data source types that store and/or provide external access differently, such as use different storage technologies, different schemas, different formats, different declarators (which is data that is added by the logging service to received log data and that is for use by the logging service), etc. As part of aggregating log data from different log data sources (which may include log generators and/or other logging services), a logging service typically attempts to expose relationships between the log data collected from the different log data sources. To do this, the log data from the different log data sources is normalized. To provide an example, in the context of relational databases this may mean naming the columns in tables with the same names (in other words, use the same schema).

There are multiple normalization standards, such as the Open Cybersecurity Schema Framework (OCSF), the Common Information Model (CIM), the Common Event Format (CEF). If log data sources conformed to one of these standards, a logging service could easily collect the log data from these log data sources and easily determine the above discussed relationships between this log data. However, for a given logging service, the log data from any non-conforming log data source (a log data source that does not conform to one of the standards and/or conforms to a different one of the standards than the given logging service) must be normalized (that is, the given logging service must re-label the raw log data received from the non-conforming log data source). Such normalization may be performed as part of an integration process called extract, transform, and log (ETL) (sometimes also referred to as data ingestion), which is a data integration process that combines, cleans, and organizes data from multiple sources into a single consistent data set for storage in a data warehouse, data lake, or other target system.

BRIEF DESCRIPTION OF THE DRAWINGS

The following figures use like reference numbers to refer to like elements. Although the following figures depict various example embodiments, alternative embodiments are within the spirit and scope of the appended claims. In the drawings:

FIG. 1 is a block diagram illustrating a system for querying across different log data source types according to some embodiments.

FIG. 2B is a table illustrating application of the concepts of label fields and data fields to different log data source types according to some embodiments.

FIG. 2C is a block diagram that expands some boxes of FIG. 1 to illustrate additional detail according to some embodiments.

FIG. 3 is a flow diagram illustrating a flow diagram for querying across different log data source types according to some embodiments.

FIG. 6 is a flow diagram illustrating an exploded view of block 306 according to some embodiments.

FIG. 7 is a flow diagram illustrating an exploded view of block 308 according to some embodiments.

FIG. 8A is a flow diagram illustrating data categorization according to some embodiments.

FIG. 8B is a flow diagram illustrating an expanded view of block 304 according to some embodiments.

FIG. 8C is a flow diagram illustrating an expanded view of block 700 according to some embodiments.

FIG. 10A is a block diagram illustrating exemplary implementations of the map generator according to some embodiments.

FIG. 11A is a table illustrating roles of nodes and fields of those nodes according to some embodiment.

FIG. 11B is a block diagram illustrating an example instance graph according to some embodiments of the invention.

FIG. 11C is a block diagram illustrating a second example instance graph according to some embodiments of the invention.

FIG. 11D is a block diagram illustrating a third example instance graph according to some embodiments of the invention.

FIG. 12 is a block diagram illustrating an exemplary system level query and the resulting instance level queries according to some embodiments.

FIG. 13B is a block diagram illustrating the exemplary system level query and the other half of the resulting instance level queries according to some embodiments.

FIG. 14 is a block diagram illustrating a third exemplary system level query and the resulting instance level queries according to some embodiments.

DETAILED DESCRIPTION

Figure 2A:
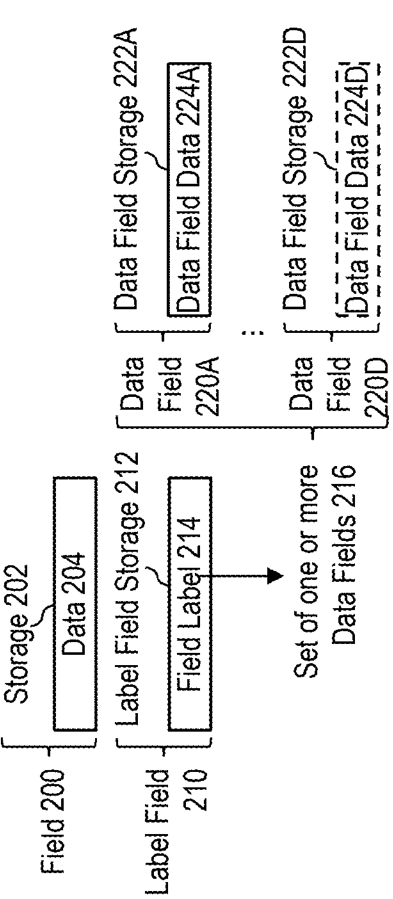
FIG. 2A is a block diagram illustrating relationships between label fields and data fields according to some embodiments.

The following description describes embodiments for querying across different log data source types. In some embodiments, label fields used by structures in instances of different log data source types are classified according to a plurality of field types, and path information to access the structures and mappings of at least some of the field labels to the plurality of field types is stored in maps. These maps are used, responsive to a high-level query (sometimes referred to as a system level query), to generate separate queries (sometimes referred to as instance level queries) for instances of at least two of the different log data source types. In some embodiments, query graphs are generated for the instances of the different log data source types based on the maps and a set of the plurality of field types that was identified from the high-level query. These query graphs are used to generate the separate queries (sometimes referred to as instance level queries) for the instances of the at least two of the different log data source types. These separate queries are submitted to respective ones of the instances, and query results (sometimes referred to as instance level query results) are received in response. These instance level query results are transmitted in response to the high-level query.

Such embodiments perform no (or significantly less) normalization and do not require (or require significantly less) schema conformance by log data sources (instances of the different log data source types, be they of the log generator class and/or the log aggregator class) to a particular schema. This is advantageous because normalization is: 1) costly to setup (in terms compute, power, and storage; and well as human effort); 2) costly to maintain (in terms compute, power, and storage; as well as human effort) and error prone since providers of log data source types update (add, remove, change) storage technologies, schemas, formats, declarators, etc.; and 3) costly to operate (in terms compute, power, and storage). For example, a logging service that performs ETL will need to ingest any log data from any log data sources that a user of the logging service may request, and do so ahead of time to be able to respond to the user in a timely manner. As such, a first factor is the cost to set up, maintain, correct errors, and operate a logging service that performs normalization.

Surprisingly, depending on the scenario, the operation of the electronic device(s) involved may be improved with embodiments described herein improved. For instance, consider a second factor to be the cost to set up, maintain, and operate one of the embodiments described herein. A variety of variables impact these factors, such as frequency of queries, required timeliness of query results, volume of data queried, which log data sources must or must have provided log data to satisfy the query, frequency of updates (additions, removals, changes to storage technologies, schemas, formats, declarators, etc. used by the log data sources), etc. However, when the variables impacting this first and second factors result in the second factor being less than the first factor, the operation of the electronic device(s) involved is improved (less compute time, less compute resources, less power, and/or less storage) by use of one of the embodiments described herein. Thus, embodiments of the invention are data and tool agnostic in that they do not require schema normalization or data ingestion.

Also, embodiments, which support the submission of a single system level query that is converted into instance level queries for different instances of a log data source and/or instances of different log data sources, means a single interface (e.g., an application programming interface (API), graphical user interface (GUI), etc.) can provide the ability to collect potentially all relevant data field data from all relevant structures of all relevant instance of all relevant log data sources. This same single interface also provides the ability to query a single structure from any one of the different instances of any one of the different log data source types. This means that a user and/or application can learn/be programmed to use the single interface, rather than each user and/or application needing to learn/be programmed: 1) to know of the instances of the different data sources; 2) how to access the instances of the different data sources; 3) use the different interfaces of the different log data source types; and 4) to know the field labels used by the different structures of the different instances. In other words, access to the structures/instances/log data source types is centralized. This improves the operation of the electronic device(s) implementing embodiments (e.g., more storage is required if each application accessing this log data must include code/knowledge to submit separate queries).

Further, due to the single interface, embodiments may be used for a variety of different purposes, such as: information technology (IT) use cases, cybersecurity, firewall compliance (e.g., confirming firewall log timing), email issues/timing, etc. By way of more specific example, the same single interface may: 1) at a first time be used to check firewall compliance (access log data in instances populated by firewalls or regarding firewalls, but not other structures, instances, or log data source types); 2) at a second time be used to check for an email issue (access log data in instances populated by email clients/servers or regarding email clients/servers, but not other structures, instances, or log data source types); etc. Also, the same single interface may be used to access log data for use cases that require the collection (or potentially correlation) of data from many different structures/instances/log data source types.

FIG. 1 is a block diagram illustrating a system for querying across different log data source types according to some embodiments. FIG. 1 includes service(s) 101, which may additionally or alternatively include applications and/or appliances, which may be log generators and/or logging services that are of different log data source types 102 and that store log data in instances 104 (also referred to as log data sources). For example, the log data source types 102 may include log data source type 102A to 102N, and there is at least one instance 104 in each. The reference labels of the instances have the format 104*x.y*, where x matches the letter of the log data source type and y distinguishes between instances of that log data source type (e.g., log data source type 102A includes instance 104A.1, and optionally additional instances shown as with a " . . . " and dashed box for instance 104A.M; log data source type 102N includes instance 104N.1, and optionally additional instances shown as with a " . . . " and dashed box for instance 104N.P). As described above, instances in different ones of the log data source types 102, and potentially instances within a same one of the log data source types 102, may use different storage technologies, different schemas, different storage formats, different declarators, etc.

FIG. 1 also shows user devices 180 (e.g., user device 180A to 180S) that are communicatively coupled to a network 182 and that may be used by users 184 (e.g., user 184A to 184S). While the service(s) 101 may be generating and/or collecting log data from one or more of user devices 180, additionally or alternatively the log data is being generated and/or collected from other electronic devices (e.g., in a private or public cloud; operating as web servers, file servers, etc.). The different log data may include, for example, application logs, security logs, network logs, system logs, or any other types of logs that allow for the retrieval of the log data in a structured or semi-structured format.

FIG. 1 also shows a query distributor 100 with a map generator 110 that is communicatively coupled with instances 104 (e.g., through a data source accessor 106 of query distributor 100). The map generator 110 attempts to classify, according to a plurality of field types, label fields used by structures in instances 104 of the log data source types 102.

As described in more detail later herein, the different storage technologies, schemas, etc. of instances 104 of log data source types 102 are viewed by query distributor 100 as including: 1) structures of different structure types; and 2) different path information to access the structures of those structure types within the instances. Each of the instances 104 includes at least one structure, and each of the structures includes at least one of the label fields and at least one data field associated with that label field. The label fields store field labels descriptive of the associated data fields. To provide a preview of the later explanation, in the case of relational databases, an instance is a database that stores structures/tables, each table includes columns with an associated schema (which is identified as field labels/column names stored in label fields) and rows (where the intersection of a column and row is a data field to store data for which the field label/column name is a descriptor).

The map generator 110 stores a plurality of maps 130, where the map for an instance stores: 1) the path information to access at least one structure in that instance; and 2) the mappings of at least some of the field labels of that structure to the plurality of field types. The same x.y format used for instances 104 is used for instance maps 132; thus, instance map 132A.1 is for instance 104A.1.

In some embodiments, map generator 110 is, for each of the instances, to: 1) connect to the instance; 2) identify the set of one or more structures in the instance, including any path information to access the set of structures; and 3) for each of the set of one or more structures, to: a) determine a set of one or more of field labels for that structure; and b) for each of the set of field labels for that structure, attempt to determine one of the plurality of field types for that field label. This process is performed each time an instance of a data source type is added to the system, as well as subsequently to maintain the mappings (e.g., some embodiments may redo this process for each instance on a schedule, such as once a day, week, etc., and then replace or update the respective instance map; some embodiments may be notified of any change that affects a structure's field labels (e.g., schema), and in response change the appropriate instance map accordingly; etc.)

FIG. 1 also shows query distributor 100 with a system level query manager 140 communicatively connected the network 182 to receive system level queries (e.g., system level query 142) and transmit in response instance level query results (e.g., instance level query results 166). While FIG. 1 shows the system level queries and instance level query results being communicated between the query distributor 100 and one or more of user devices 180, such communication may additionally or alternatively be less direct (e.g., there may be one or more other services, that responsive to user interactions, generate the system level queries; and/or receive the instance level query results and process them in some manner before they are sent to one of the user devices 180.

Query distributor 100 also includes: 1) a system level query field label and field type determiner 146 to determine a set of one or more of the plurality of field types involved in a given system level query; and 2) an instance level query graph manager 150 to generate instance level query graphs 156 based on the plurality of maps 130 and the set of field types involved in the system level query. Instance level query graphs 156 include a set of one or more instance query graphs 158, each being for one of instances 104. The same x.y format used for instances 104 is used for the instance query graphs; thus, instance query graph 158A.1 is for instance 104A.1. Instance level query graphs 156 identify those of the field labels determined to be mapped to one of the set of field types, those of the structures that use those field labels, and any of the path information to access those structures.

Query distributor 100 also includes an instance level query manager 160 to: 1) generate a set of one or more instance level queries for a set of one or more of the instances 104 according to the instance level query graphs 156; 2) submit the set of instance level queries to the set of one or more of the instances 104, as well as to receive the instance level query results in response (e.g., through data source accessor 106); and 3) provide instance level query results 166 to system level query manager 140. In some embodiments, the instance level query manager 160 is, from each of the query graphs, to generate the instance level queries based on the field labels, structures, and any path information to reach those of the structures for which there is at least mappings for every one of the set of field types identified from the system level query.

FIG. 2A is a block diagram illustrating relationships between label fields and data fields according to some embodiments. FIG. 2A shows a generic field 200, which refers to both storage 202 and data 204 in that storage. One type of field is referred to as label field 210, which refers to label field storage 212 and date (field label 214) in that storage. Another type of field is referred to as a data field. A set of one or more data fields 216 may be associated with a label field 210, in which case the field label 214 is descriptive of that set of one or more data fields 216 (e.g., data field 220A to data field 220D). The storage of a data field (e.g., data field 220A) is referred to as data field storage (e.g., data field storage 222A), and the data in that field is referred to as data field data (e.g., data field data 224A).

FIG. 2B is a table illustrating application of the concepts of label fields and data fields to different log data source types according to some embodiments. The first column of the table shows various exemplary log data source types, and the rest of the columns illustrate what the terms label field storage, field label, data field storage, data field data, path information, and structure type refer to for the exemplary log data source types. For instance, the first row is for relational database/SQL. In this row: 1) the structure type is table; 2) the path information, in at least some databases, is the database name and the table name for the table; 3) a field label is a column name for a column in the table, and thus is part of the schema for the table; 4) a label field storage is the part of the storage for the column name of the table's schema; 5) data field storage is the storage for a cell of the table (that is, the storage for data at the intersection of a column and a row of the table); and 6) data field data is the data in a cell of the table.

As another example, the second row is for JavaScript Object Notation (JSON). In this row: 1) the structure type is key-value pair; 2) the path information, in at least some cases, is the key fields of those of the key-pairs that nest other key-value pairs; 3) a field label is a key in the key field of a key-value pair; 4) a label field storage is the storage for the key; 5) data field storage is the storage for the value of a key-value pair; and 6) data field data is the value in of a key value pair.

Other examples are shown. While the term schema (and the plural schemata) may most often be used with reference to relational database tables, the term is sometimes used herein to refer to the field labels used by the structures in any of the log data source types.

FIG. 2C is a block diagram that expands some boxes of FIG. 1 to illustrate additional detail according to some embodiments. FIG. 2C shows: 1) log data source type 102A including instance 104A.1, optionally instance 104A.2, and optionally additional instances; and 2) log data source type 102N including instance 104N.1 and optionally other instances. FIG. 2C additionally shows structures in those instances, where the structures include label fields and data fields. The prior x.y format is extended to a x.y.z format for the structures, label fields, and data fields. For instance: 1) instance 104A.1 is shown as including structure 232A.1.1 (with label fields 234A.1.1 and data fields 236A.1.1), optionally structure 232A.1.2 (with label fields 234A.1.2 and data fields 236A.1.2), and optionally additional structures; 2) instance 104A.2 is shown as including structure 232A.2.1 (with label fields 234A.2.1 and data fields 236A.2.1), and optionally additional structures; and 3) instance 104N.1 is shown as including structure 232N.1.1 (with label fields 234N.1.1 and data fields 236N.1.1) and optionally additional structures.

By way of example, FIG. 2C shows: 1) field labels 250A and 250F in label fields 232A.1.1; and 2) field label 250L in label fields 232N.1.1. FIG. 2C also shows as optional: 1) field label 250K in label fields 232A.1.1; 2) one or more of field labels 250F, 250K, and 250H in label fields 232A.1.2; 3) one or more of field labels 250F, 250K, and 250H in label fields 232A.2.1; and 4) field labels 250F and 250K in label fields 232N.1.1.

Also by way of example, FIG. 2C shows map generator 110 that associates field labels 250 to field types 252. In particular: 1) field label 250A is associated with field type 252A; 2) field label 250F is associated with field type 252D and optionally also to optional field type 252 Q; 3) optional field label 250K is associated with field type 252D and optionally also to optional field types 252Q and 252H; 4) optional field label 250H is associated with optional field type 252H; and 5) field label 250L is associated with field type 252J. These associations are shown as examples to illustrate the flexibility of the embodiments described herein.

In FIG. 2C, the maps 130 are shown as being separated into a path 240 part and a mappings 242 part (which are mappings of field labels to field types). For instance, the instance map 132A.1 includes: 1) a path(s) to structure(s) 240A.1 part to store path information to reach the structures (e.g., structure 232A.1.1) within the instance 132A.1); and 2) a mappings 242A.1 part (e.g., those determined for the structure 232A.1.1 by map generator 110). In the example of FIG. 2C, mappings 242A.1 part would store the mappings of: 1) field label 250A to field type 252A; and 2) field label 250F to field type 252D, as well as optionally to field type 252Q.

Some embodiments of map generator 110 can automate the learning of new field labels. The automatic learning of field labels means that if that field label, or something similar, is seen again in the future, some such embodiments will require fewer resources (compute/time/power/network bandwidth) to match. Thus, while an administrator may manually add field labels, this automated learning simplifies maintenance and improves performance of the electronic device(s) implementing such embodiments. Examples of such embodiments are described later herein.

In the example of FIG. 2C, it is assumed that a system level query was received, and system level query field label and field type determiner 146 identified field type 252D as one of system level query field type(s) 226.

Continuing the example, in response to the system level query, the instance level query graph manager 150 generates the appropriate ones of instance level query graphs 156. Within instance level query graphs 156, the same x.y format is used for the set of one or more instance query graphs 158 (e.g., instance query graph 158A.1 and 158N.1 correspond to instance 104A.1 and instance 104N.1).

The instance query graphs are made up of nodes connected by edges, where different nodes play different roles. For example, a graph may have one or more root nodes, where each of these root nodes may have edges directly connecting that root node to one or more dependent nodes, each of which may be: 1) a leaf node (a node that has no dependent nodes); or 2) an intermediate node (a node that has one or more edges directly connecting it to one or more dependent nodes, and so on, until leaf nodes are reached. Thus, a path may have multiple levels: a root node level, a leaf node level, and zero or more intermediate node levels.

A first node with an edge to a dependent second node is sometimes described as having a parent child relationship (the first node and second node are respectively referred to as a parent node of the child node); and thus the second node is a direct descendant of the first node. A root node has no parent nodes but has one or more child nodes; a leaf node has one or more parent nodes but no child nodes; an intermediate node has one or more parent nodes and one or more child nodes. The descendants of a given node would include any direct descendant nodes, as well as descendants of those nodes until leaf nodes are reached. In contrast, the ancestors of a given node would include any parent nodes, as well as parent nodes of those nodes until root node(s) are reached The edge(s) and any intermediate nodes connecting a root node to a leaf node is referred to as a path of the graph (or a graph path), which is different from, but may align with, the path information or path to reach a structure in an instance.

In this context, the instance level query graphs 156 are separated into: 1) a path(s) 256 part; and 2) a matching field label(s) and field type(s) 254 part. The paths(s) 256 part includes nodes that are sometimes referred to as path nodes. The path nodes may be used to store/represent different information depending on the log data source type 102, and thus the path nodes can be thought of as having one or more roles (e.g., root node/level 1 path node, intermediate node/level N path node, last level path node/structure node). For example, the instance query graph 158A.1 may: 1) optionally include one or more levels of path node(s) 264A to store path information to reach the structure(s) in instance 104A.1 (the role for at least one of these path nodes will be root node/level 1 path node, while the role of some of these path nodes may be intermediate node/level N path node); and 2) a node to represent each of the structure(s) in instance 104A.1 (the role of these nodes will be last level path node/structure node). Using the path information from row 1 of the table in FIG. 2B for instance 104A.1, there may be: 1) a path node 264A playing the role of a root node/level 1 path node for the database name; and 2) a path node 262A.1 playing the role of a last level path node/structure node for the table name. To provide another example, the path(s) 256 part of instance query graph 158N.1 includes a single node because the instance 104N.1 supports having a single structure 232N.1.1; thus, the roles of this single node are both root node and structure node.

The matching field label(s) and field type(s) 254 part includes nodes in the role of leaf nodes/field nodes. For example: 1) instance query graph 158A.1 includes field node 260A that depends from structure node 262A.1.1, as well as optionally other field nodes; and 2) instance query graph 158N.1 includes field node 260E that depends from structure node 262A.1.1, as well as optionally other fields nodes. Each of the field nodes includes a mapping of a field label to a field type (e.g., field node 260A includes the mapping of field label 250F to field type 252D, while field node 260E includes the mapping of field label 250K to field type 252D). Also, FIG. 2C shows that if structure 232A. 1.2 is present in instance 104A.1 and includes field label 250F, structure node 262A.1.2 may be present and depend from path node(s) 264A and depend on field node 260A. In other words, dashed boxes in the instance level query graphs 156 assume: 1) structure 232A.1.1 and 232A.1.2 includes field label F; and 2) structure 232N.1.1 includes field label K; and 3) both field label F and K are mapped to field type 252D.

Again using the path information from row 1 of the table in FIG. 2B for instance 104A.1, there may be: 1) a path node 264A playing the role of a root node/level 1 path node for the database name; 2) a path node 262A.1 playing the role of a last level path node/structure node for the table name; and 3) a field node for each field label/column name of the table.

In some embodiments, instance level query graph manager 150, as part of the generation of each of the set of query graphs, does the following: 1) generates an initial query graph for each of the field labels in the set of field labels determined to be included in that instance; and 2) when there is more than one initial query graph for that instance, merges the initial query graphs to form the query graph. In some such embodiments, each of these initial query graph includes: 1) a field node that includes a mapping of one of the field labels to one of the field types; 2) a set of one or more structure nodes representing a respective set of one or more of the structures that are in the instance and that include the field label, wherein the set of structure nodes depend on the field node; and 3) any path nodes needed to identify path information to reach the set of structures in the instance, wherein each of the path nodes depends directly or indirectly on the set of one or more structure nodes.

Instance level query manager 160 is, for at least one of the structure nodes from which depends on a set of one or more field nodes representing mappings for every one of the set of field types identified from the system level query, to generate one of the set of instance level queries based on the set of field nodes, the at least one structure node, and any path information in any path nodes on which the structure node depends directly or indirectly.

Thus, the field labels 250 from the structures 232 of the instances 104 of the log data source types 102 are matched to field types 252, and mappings 242 for these matches are stored in the maps 130. Then in response to a system level query 142 from which a set of one or more of the field types 252 may be identified, the set of field types is used, in conjunction with the maps 130, to determine for which mapping(s) 242 to include field nodes, for which structure(s) 232 to include structure node(s), and for which of the instance(s) to generate instance query graph(s). Thus, map generator 110 may operate in the order of instance 104, structure 232, field label 250, field type 252; in contrast, instance level query graph manager 150 may operate in the order of field type 252, field label 250, structure 232, instance 104.

Since the maps 130 focus on storing the path information and the field labels 250, but not the data field data in the data fields 236, of the structures 232 of the instances 104, the maps 130 require relatively little storage as compared to an implementation that performs ETL to: 1) ingest and normalize the field labels; and 2) ingest, and potentially normalize, the data field data from the data fields 236 of the structures 232 of the instances 104. For similar reasons, generating and maintaining the maps 130 requires less resources (less compute, time, network bandwidth, etc.) than an implementation that performs ETL. However, instance level query manager 160:1) submits one or more instance level queries to the instances based on the generated instance level query graphs 156; and 2) receives the instance level query results back from the instances. The compute, time, and network traffic consumed by the instance level query manager 160 will likely be more than an implementation that performs ETL because the implementation that performs ETL may be able to generate and submit one query. As discussed above, surprisingly, depending on the scenario, the operation of the electronic device(s) involved may be improved using one of the embodiments described herein as compared to an implementation that performs ETL.

In terms of the use of field labels, the same field label is typically not used more than once in a given structure. However, the same field label may be used in different structures of the same instance, structures of different instances of the same log data source type, and/or structures of instances of different log data source types. For example, see field label 250F mapped to field type 252D. Also, the same field label may be mapped to more than one field type. For example, when field label 250F is mapped to field type 252D and 252Q. Different field labels may be used in the same structure, different structures of the same instance, structures of different instances of the same log data source type, and/or structures of instances of different log data source types. For example, when field label 250F and 250K are mapped to field type 252D. Also, such field labels may be mapped to multiple field types; such as when field labels 250F and 250K are mapped to field types 252D and 252Q. Also, where different field labels are used (in the same structure, different structures of the same instance, structures of different instances of the same log data source type, and/or structures of instances of different log data source types), and one is mapped to multiple field types, and the other is mapped to one or more field types, then the field types of the field labels may overlap. For example, when field label 250F is mapped to field types 252D and 252Q, while field label 250K is mapped to either field type 252D or both field types 252D and 252H.

In some embodiments, system level query field label and field type determiner 146 is to parse the system level query to identify a set of one or more items, wherein the items include at least: 1) one of the field labels; 2) one of the field types; 3) data; or 4) a combination of one of the field labels, a condition, and data. In addition, for each of the items that does not include one of the field types, system level query field label and field type determiner 146: 1) attempts to determine one of the field types for the item; and 2) when the item includes one of the field types or one of the field types was determined for the item, add that field type to the set of field types for the system level query. Alternative embodiments may use other approaches.

In some embodiments, system level query field label and field type determiner 146 and/or instance level query manager 160 also implement query optimization and/or some best practices specific to different ones of the log data source types.

Also, embodiments require a relatively small amount of compute and storage, meaning an embodiment may be deployed in a customer's environment (also referred to as a customer managed production environment) as opposed to having to be offered as a cloud service.

FIG. 3 is a flow diagram illustrating a flow diagram for querying across different log data source types according to some embodiments. The figure(s) illustrating flow diagrams (e.g., FIG. 3) sometimes refer to the figure(s) illustrating block diagrams (e.g., FIG. 1), and vice versa. Whether or not explicitly described, the alternative embodiments discussed with reference to the figure(s) illustrating block diagrams also apply to the embodiments discussed with reference to the figure(s) illustrating flow diagrams, and vice versa. At the same time, the scope of this description includes embodiments, other than those discussed with reference to the block diagrams, for performing the flow diagrams, and vice versa. For example, in some embodiments the flow in FIG. 3 is performed by query distributor 100 of FIG. 1.

Block 300 shows attempting to classify, according to a plurality of field types, label fields used by structures in instances of different log data source types. The different log data source types may use different structure types and different path information to access the structures of those structure types within the instances. Each of the instances may include at least one structure, and each of the structures may include at least one of the label fields and at least one data field associated with that label field. The label fields may store field labels descriptive of the associated data fields. For example, field labels may indicate the name, type, function, or meaning of the data fields. The data fields may store data values, such as numbers, strings, dates, or any other suitable data. The attempting to classify may include, for example, applying one or more classification algorithms, rules, heuristics, or techniques to the label fields to determine their field types. The field types may include, for example, predefined categories or classes of field labels that share common characteristics, such as data format, data content, data semantics, data relevance, etc.

As previously described, the term schema (and the plural schemata) may most often be used with reference to relational database tables, the term is sometimes used herein to refer to the field labels used by the structures in any of the log data source types. Using this terminology, block 300 may be phrase attempting to map, to a plurality of field types, the schemata of structures in different instances of different log data source types; where the different log data source types use different structure types and different path information to access the structures of those structure types within the instances; and where the schemata includes field labels descriptive of associated data fields in the structures.

Block 302 shows storing a result of the attempting in block 300. The result may include, for example, the path information to access the structures and mappings of at least some of the field labels to the plurality of field types. In some embodiments, the storing may include, for example, creating, updating, or modifying one or more maps 130. Thus, in some embodiments, blocks 300 and 302 are performed by map generator 110 to generate and maintain maps 130.

Block 304 shows, responsive to submission of a system level query, determining a set of one or more of the plurality of field types involved in the system level query. The system level query may specify one or more criteria, conditions, filters, or parameters. For example, the system level query may request data from instances that have a field type of IP address, and that have a data value of a specific IP address or a range of IP addresses. Block 304 may include, for example, parsing, analyzing, or interpreting the system level query to identify the set of field types that are relevant to the system level query. With reference to FIG. 1, block 304 may be performed by system level query field label and field type determiner 146.

Block 306 shows generating a set of one or more query graphs based on the set of field types and the result of block 302. The set of query graphs may include, for example, graphical representations of the relationships between the field types, the field labels, the structures, and the path information for those of the instances that are involved in the system level query. The set of query graphs may identify those of the field labels determined to be mapped to one of the set of field types identified from the system level query, those of the structures that use those field labels, and any of the path information to access those structures. With reference to FIG. 1, the set of query graphs may be one or more instance level query graphs 156 that are generated by the instance level query graph manager 150. Each of the queries in the set of query graphs may be for one of the instances 104. With reference to FIG. 1, block 306 may be performed by instance level query graph manager 150 and include, for example, retrieving, accessing, or querying the one or more maps 130 that store the result of block 300.

Block 308 shows generating a set of one or more instance level queries for a set of one or more of the instances according to the set of query graphs. The set of instance level queries will be specific to the structure types and the path information of the set of instances. The set of instance level queries may include the same or similar criteria, conditions, filters, or parameters as the system level query, but expressed in terms of the field labels, the structures, and the path information of the set of instances. Thus, blocks 304 to 308 may include, for example, translating, converting, or transforming the system level query into the set of instance level queries through use of instance query graphs.

Optional block 310 shows submitting the set of one or more instance level queries to the set of one or more of the instances. This submitting may include, for example, sending, transmitting, or communicating the set of instance level queries to the set of instances over a network. The set of instances may include or be hosted on, for example, one or more servers, databases, electronic devices, or any other suitable sources of log data.

Optional block 312 shows receiving a set of one or more instance level query results responsive to block 310. The set of instance level query results may include, for example, data field data from the data fields of the structures of the set of instances that satisfy the set of instance level queries. With reference to FIG. 1, blocks 308 to 312 may be performed by instance level query manager 160.

Block 314 shows transmitting results as a response to submission of the system level query. With reference to FIG. 1, blocks 314 may be performed by instance level query manager 160 through system level query manager 140. In other embodiments, the query distributor 100 may be a part/component of a larger application/service, of which one or more other components receive the system level query, route it to query distributor 100 component, receive back query results transmitted by query distributor 100 component, perform analysis, and provide results back to the submitter. In embodiments that implement blocks 310 and 312, block 314 may include, for example, transmitting the set of instance level query results to: 1) the submitter (e.g., the user device, or the application) of the system level query; and/or 2) another component of a larger application/service that includes the query distributor 100. Additionally or alternatively, block 314 may include transmitting the results of some analysis (e.g., by another part/component of a larger application/service that includes a query distributor 100 component; by a second service with which the query distributor 100 communicates the set of instance level query results) of the set of instance level query results (e.g., an indication of a detected threat). Additionally or alternatively, embodiments may transmit as results in block 314 the generated set of one or more instance level queries for the set of one or more of the instances. In such embodiments the generated instance level queries may be provided to the submitter for a variety of reasons (e.g., to understand how the set of instance level query results were generated by reviewing the set of instance level queries; to allow the submitter to submit one or more of the set of instance level queries themselves; to allow the submitter to edit the set of instance level queries and instruct the query distributor 100 to resubmit the edited versions of the instance level queries; to allow the submitter to review, and possibly edit, the set of instance level queries before submission (effectively, similar operations as blocks 310 and 312, but after block 314); etc.). Additionally or alternatively, block 314 may include transmitting the set of instance level queries and/or instance level query results to another part/component of a larger application/service or a second service that will: 1) allow the submitter to review, and possibly edit, the instance level queries; 2) submit the instance level queries; 3) analyze the instance level query results (which second service may then interact with the submitter regarding the results of the analysis). By way of example, in one embodiment, the query distributor 100 is a component of a larger application service, in which: 1) the query distributor 100 component is provided the system level queries, generates the instance level queries, submits the instance level queries, receives the query results, stores the instance level queries and instance level query results; and 2) other components analyze (or causes to be analyzed) the query results, and allows for interaction by the submitter (e.g., providing the results of the analysis; allowing access to (e.g., viewing, downloading, and/or editing) the generated instance level queries; allowing access to (e.g., viewing, downloading, etc.) the instance level query results.

Figures 4A, 4B:
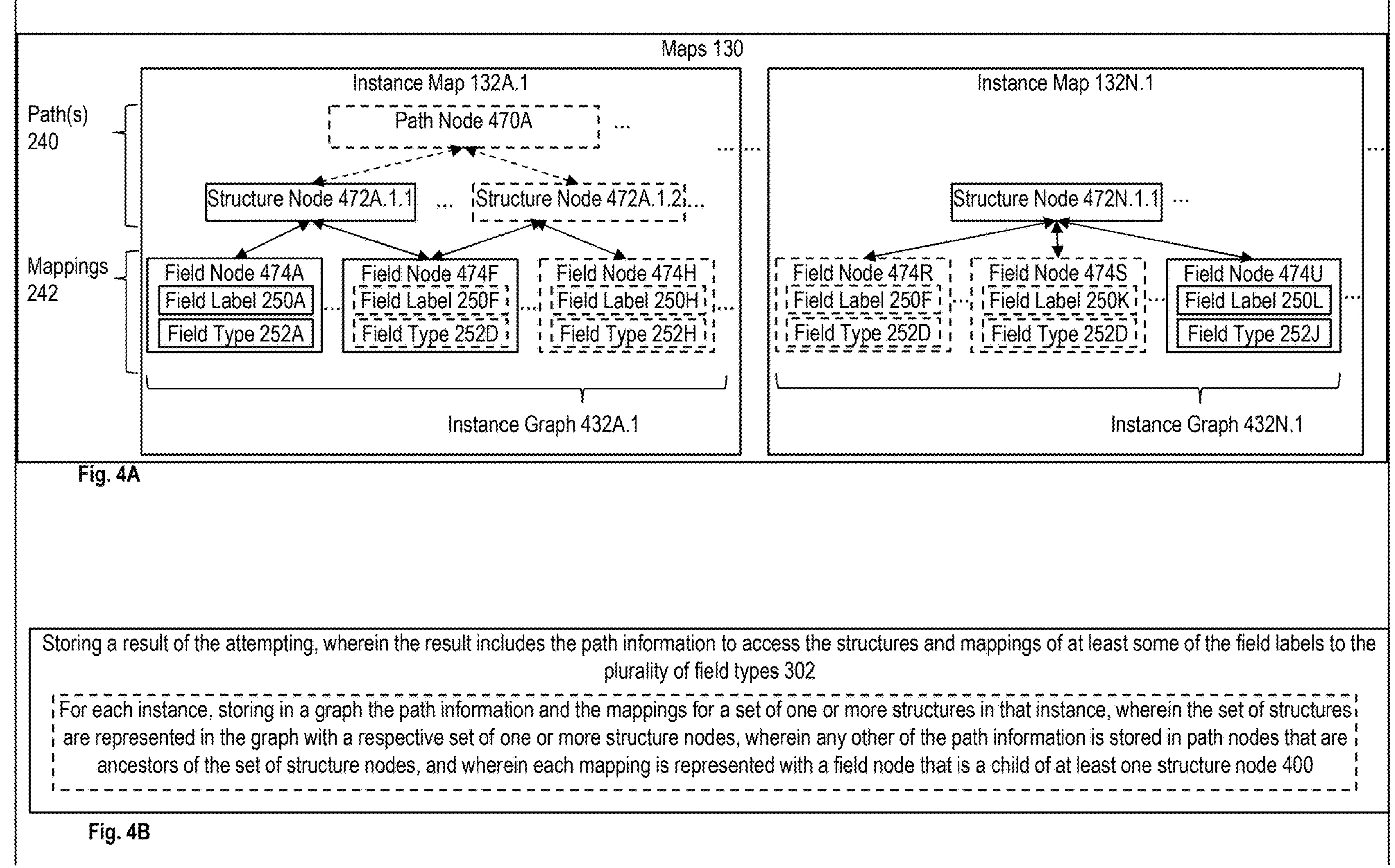
FIG. 4A is a block diagram illustrating the storage of instance maps in the form of instance graphs according to some embodiments.
FIG. 4B is a flow diagram illustrating the storing of instance maps in the form of instance graphs according to some embodiments.

FIG. 4A is a block diagram illustrating the storage of instance maps in the form of instance graphs according to some embodiments. FIG. 4A shows maps 130 including instance map 132A.1 and instance map 132N.1 (as well as additional instance maps) implemented as instance graph 432A.1 and instance graph 432N.1, respectively. As illustrated, the instance graphs are organized in a comparable manner to instance level query graphs 156. In particular, instance graph 432A.1, instance graph 432N.1, path(s) 240 part, mappings 242 part, path node(s) 470A, structure node 472A.1.1, structure node 472A.1.2, field node 474F, structure node 472N.1.1, and field node 474S are respectively similar to the following from FIG. 2C: instance query graph 158A.1, instance query graph 158N.1, path(s) 256 part, matching field label(s) to field type(s) 254 part, path node(s) 264A, structure node 262A.1.1, structure node 262A.1.2, field node 260A, structure node 262N.1.1, and field node 260E. In addition, FIG. 4A shows includes: 1) a field node 474A (including the mapping of field label 250A to field type 252A) depending from structure node 472A.1.1; 2) optionally a field node 474H (including the mapping of field label 250H to field type 252H) depending from structure node 472A.1.2; 3) optionally a field node 474R (including the mapping of field label 250F to field type 252D) depending from structure node 472N.1.1; and 4) a field node 474U (including the mapping of field label 250L to field type 252J) depending from structure node 472N.1.1. The dashed boxes in instance graph 432 assume: 1) structure 232A.1.1 and 232A.1.2 includes field label F; 2) structure 232A.1.2 includes field label H, and it is mapped to field type H; 3) structure 232N.1.1 includes field labels F and K; and 4) both field labels F and K are mapped to field type D.

Thus, each of the maps 130 is an instance graph for a respective one of the instances, where each instance graph includes the path information and the mappings for a set of one or more of the structures in the respective instance, where: 1) the set of structures are represented in the instance graph with a respective set of one or more structure nodes; 2) any path information is stored in path nodes that are ancestors of the set of structure nodes, and 3) each of the mappings is represented with a field node that is a child of at least one structure node.

FIG. 4B is a flow diagram illustrating the storing of instance maps in the form of instance graphs according to some embodiments. FIG. 4B shows that, in some embodiments, block 302 may be implemented with a block 400. Block 400 shows, for each instance, storing in an instance graph the path information and the mappings for a set of one or more of the structures in that instance; where the set of structures are represented in the instance graph with a respective set of one or more structure nodes, where any other of the path information is stored in path nodes that are ancestors of the set of structure nodes, and where each mapping is represented with a field node that is a child of at least one structure node. With reference to FIG. 1, block 400 may be performed by map generator 110 storing the instance graphs 432 in the maps 130.

Figure 5:
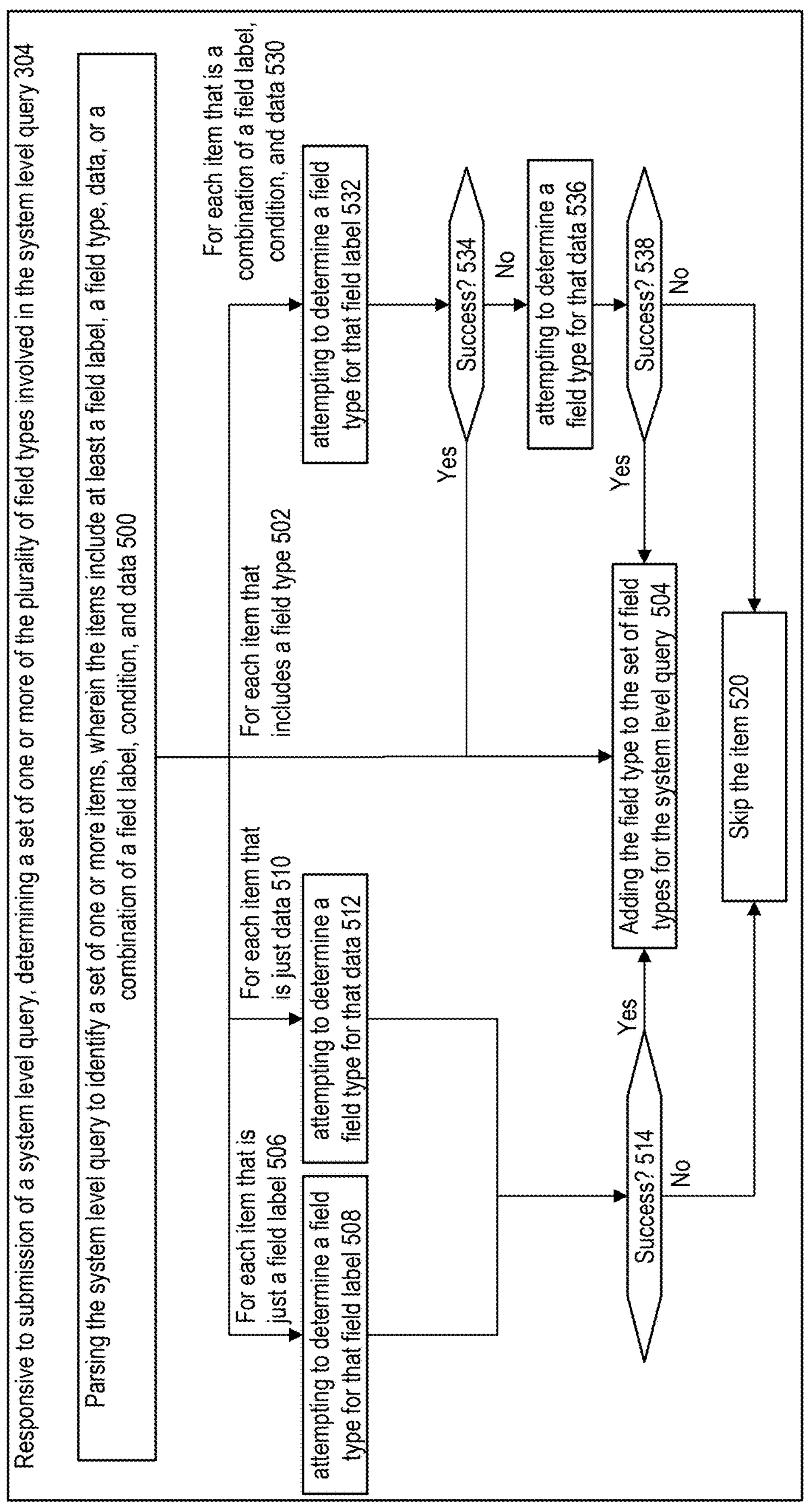
FIG. 5 is a flow diagram illustrating an exploded view of block 304 according to some embodiments.

FIG. 5 is a flow diagram illustrating an exploded view of block 304 according to some embodiments. FIG. 5 shows that, in some embodiments, block 304 may be implemented starting with block 500. Additionally or alternatively, embodiments may support the submission of a high level system level query that is converted into (or used to generate) a set of one or more low level system level queries, which are input to block 500. In such embodiments, the high level system level query might include a set of one or more high level items. For example, a high level system level query may be "tell me if I have evilguy malware on my network" (where evilguy would be the name of known malware and considered a high level item). In response to receiving the high level system level query, the high level system level query may be parsed to identify the high level item(s) (e.g., evilguy), and the high level item(s) may be analyzed to determine low level system level queries that include low level items (which would be the items discussed in block 500).

Block 500 shows parsing the system level query to identify a set of one or more items, where the items include at least a field label, a field type, data, or a combination of a field label, condition, and data. These items are each processed (serially or in parallel).

For each of the items that include a field type (block 502), control passes to block 504. In some embodiments, determining if an item, or a part thereof, includes a field type is performed by attempting to match against field types 252. This match may be: 1) a strict match; 2) a fuzzy match; or 3) a strict match, but if the item fails the strict match, a fuzzy match. Exemplary techniques for performing strict matching and fuzzy matching are described later herein. Block 504 shows adding the field type to the set of field types for the system level query.

For each of the items that is just a field label (block 506), control passes to block 508. In some embodiments, determining if an item is a field label may be performed by: 1) optionally, determining whether the item includes a field type or condition; and 2) attempting to match the item against a list of field labels. Block 508 shows attempting to determine a field type for that field label. In some embodiments, attempting to determine a field type for the field label may be performed by attempting to match the field label against sets of field labels that are already associated with field types. From block 508, control passes to block 514. Each such match may be implemented as: 1) a strict match; 2) a fuzzy match; or 3) a strict match, but if the strict match fails, a fuzzy match. Exemplary techniques for performing strict matching and fuzzy matching are described later herein. Block 504 shows adding the field type to the set of field types for the system level query.

For each of the items that is just data (block 510), control passes to block 512. In some embodiments, determining if an item is just data may be performed by determining whether the item includes a field type, condition, or field label. Block 512 shows attempting to determine a field type for that data. This may be performed using, for example, data interrogation in the same or comparable manner as described later herein. From block 512, control passes to block 514.

Block 514 shows determining whether the attempting in block 508 or block 512 was successful. If so, control passes to block 504. Otherwise, control passes to block 520 which shows that the item is skipped.

For each of the items that is a combination of a field label, condition, and data (block 530), control passes to block 532. In some embodiments, determining if an item is such a combination may be performed by determining whether the item includes a condition. Block 532 shows attempting to determine a field type for that field label. Block 532 may be performed in an analogous manner to block 508. From block 532, control passes to block 534.

Block 534 shows determining whether the attempting in block 532 was successful. If so, control passes to block 504. Otherwise, control passes to block 536.

Block 536 shows attempting to determine a field type for that data. Block 536 may be performed in an analogous manner to block 512. Block 538 shows determining whether the attempting in block 536 was successful. If so, control passes to block 504. Otherwise, control passes to block 520.

Thus, FIG. 5 shows parsing the system level query to identify a set of one or more items. For each of the items that does not include one of the field types, attempting to determine one of the field types for the item. When the item includes one of the field types or one of the field types was determined for the item, adding that field type to the set of field types for the system level query.

FIG. 6 is a flow diagram illustrating an exploded view of block 306 according to some embodiments. FIG. 5 shows that, in some embodiments, block 306 may be implemented by performing blocks 600 and 602 as part of generating each of the set of query graphs.

Block 600 shows generating an initial query graph for each of the field labels in the set of field labels determined to be included in that instance. Each of the initial query graph includes: 1) a field node that includes a mapping of one of the field labels to one of the field types; 2) a set of one or more structure nodes representing a respective set of one or more of the structures that are in the instance and that include the field label, where the set of structure nodes depend on the field node; and 3) any path nodes needed to identify path information to reach the set of structures in the instance.

Block 602 shows that when there is more than one initial query graph for that instance, merging the initial query graphs to form the query graph. For example, assume that instance map 132A. 1 includes mappings of field labels 250A and 250F respectively to field types 252A and 252D, and assume that field types 252A and 252D are identified from the system level query. In embodiments in accordance with FIG. 6, separate initial query graph would be generated for instance 104A.1 based on field types 252A and 252D. Then, these two initial query graphs would be merged to form one of the query graphs of block 306.

FIG. 7 is a flow diagram illustrating an exploded view of block 308 according to some embodiments. FIG. 7 shows that, in some embodiments, block 308 may be implemented by performing block 700. Block 700 shows, generating, from each of the query graphs, one of the set of instance level queries based on the field labels, structures, and any path information to reach those structures that at least have mappings for every one of the set of field types identified from the system level query.

In some embodiments that use instance level query graphs with field nodes, structure nodes, and path nodes (as needed), block 700 is performed by generating, for at least one of the structure nodes from which depends a set of one or more field nodes representing mappings for every one of the set of field types identified from the system level query, one of the set of instance level queries based the set of field nodes, the at least one structure node, and any path information in any path nodes on which the structure node depends directly or indirectly.

FIG. 8A is a flow diagram illustrating data categorization according to some embodiments. FIG. 8A shows block 802. In some embodiments, block 802 may be implemented as part of the flow in FIG. 3 (e.g., as part of block 300 and/or block 302, as a separate block after block 302, etc.).

Block 802 shows classifying, according to a plurality of data categories, the structures represented in the results based on the field labels and field types stored for that structure. While in some embodiments there is a predefined list of data categories that includes one or more of firewall, proxy traffic, domain name, mail, process, file, and network traffic, other embodiments may use more, less, and/or different categories. Thus, when one of these data categories is assigned to one of the structures, that data category may be referred to as a structure descriptor.

Different embodiments may perform block 802 in different ways. In some embodiments, one or more prompts are provided to an AI model (e.g., Mistral 7B, LLama2, Llama3, ChatGPT4) and one of these data categories is output. By way of example, the set of prompts for a given one of the structures 232 may be:

1) a system prompt that reads something like "You are an experienced cybersecurity analyst. You categorize log events into categories. You can only choose 1 category. The categories to choose and their descriptions are as follows:" and be followed by a listing of the data categories and descriptions-such as one or more of those in "Data Sources" included in MITRE ATT&CK™ (published by the MITRE Corporation).
2) A user prompt that reads something like "Categorize the following data into the appropriate categories. If data is not in one of the categories listed, then output UNKNOWN. The category must be one of the provided categories. Output your answer in JSON with a single key called categories which is a list of the categories only. The field names and the field types, if we know them are as follows:" and be followed by a listing of the mapping for the structure (the field labels accessed from the structure, as well as any field types determined for those field labels).

To provide an example, assume that for the structure 104A.1, the following: 1) the list of data categories in the system prompt includes firewall; and 2) the listing of the mappings includes src_ip: SourceIPv4Address; dest_ip: DestinationIPv4Address; src_port: SourcePort; dest_port: DestinationPort. In this example, the response may be "Firewall."

While in some embodiments query distributor 100 includes logic (which is part of map generator 110, part of another component, or a separate component) that communicates (generates the set of one or more prompts, transmits them, and receives a response) with an external AI model, in other embodiments query distributor 100 may include a classifier or AI model (separately, as part of map generator 110, or as part of another component) to classify, according to a plurality of data categories, the structures based on the plurality of maps.

FIG. 8A also shows that in some embodiments that use instance graphs, block 802 may include blocks 804 and 806. Block 804 shows storing, in the instance graphs, in a manner associated with the structure nodes, the respective determined data categories. For instance, in some such embodiments, the data category for a structure may be stored: 1) as part of the edge (in a data structure that represents the edge) between the structure node that represents that structure and any parent nodes; and/or 2) within the structure node that represents that structure.

Block 806 shows storing, in the instance graphs in a manner associated with any path nodes in the instance graph, the data categories assigned to any child nodes of those path nodes. For instance, in some such embodiments, each path node (in the role of an intermediate path node or a root node) is assigned the list data categories that were assigned to that path node's direct and indirect (if any) descendant nodes. In some such embodiments, these lists of data categories may be stored: 1) as part of the edge (in a data structure that represents the edge) between the path node and any parent nodes; and/or 2) within the path node itself.

FIG. 8B is a flow diagram illustrating an expanded view of block 304 according to some embodiments. FIG. 8B shows block 304 including block 810. Block 810 shows determining whether any of the plurality of data categories are identifiable from the system level query. In some embodiments, this determination may be made in a manner like that described for the field type in FIG. 5, but by attempting to match the item to a list of the data categories. With regard to FIG. 1, system level query field label and field type determiner 146 determines whether any of the plurality of data categories are identifiable from the system level query.

FIG. 8C is a flow diagram illustrating an expanded view of block 700 according to some embodiments. FIG. 8C shows block 700 including block 820. Block 820 shows that a structures node, in addition to including mappings for every one of the set of field types identified from the system level query, must also include any of the data categories determined to be identifiable from the system level query (see block 810). In other words, from each of the query graphs, one of the set of instance level queries is generated based on the field labels, structures, and any path information to reach those structures that at least include: 1) mappings for every one of the set of field types identified from the system level query; and 2) any of the plurality of data categories determined to be identifiable from the system level query. This means that, for an instance, a structure that has all the set of field types identified from the system level query but was not assigned one of any of the data categories identified from the system level query, will be excluded from the instance level query for that instance. With regard to FIG. 1, instance level query manager (160) may perform blocks 700 and 820.

Thus, FIGS. 8A-C illustrate an optional optimization. For example, assume a user is interested in a ubiquitous field type, but only when it appears in relation to a set of one or more of the data categories. Having the set of data categories identifiable from the system level query effectively filters out any structures that are not one of that set of data categories. The operation of the electronic device(s) implementing embodiments of the invention that include this optimization is improved when there are fewer structures queried, fewer instance level queries submitted (which saves network bandwidth), less data in the returned query result (which saves compute and time that would have been used to process the extra data, as well as network bandwidth to receive that data), etc.

Figures 9A, 9B:
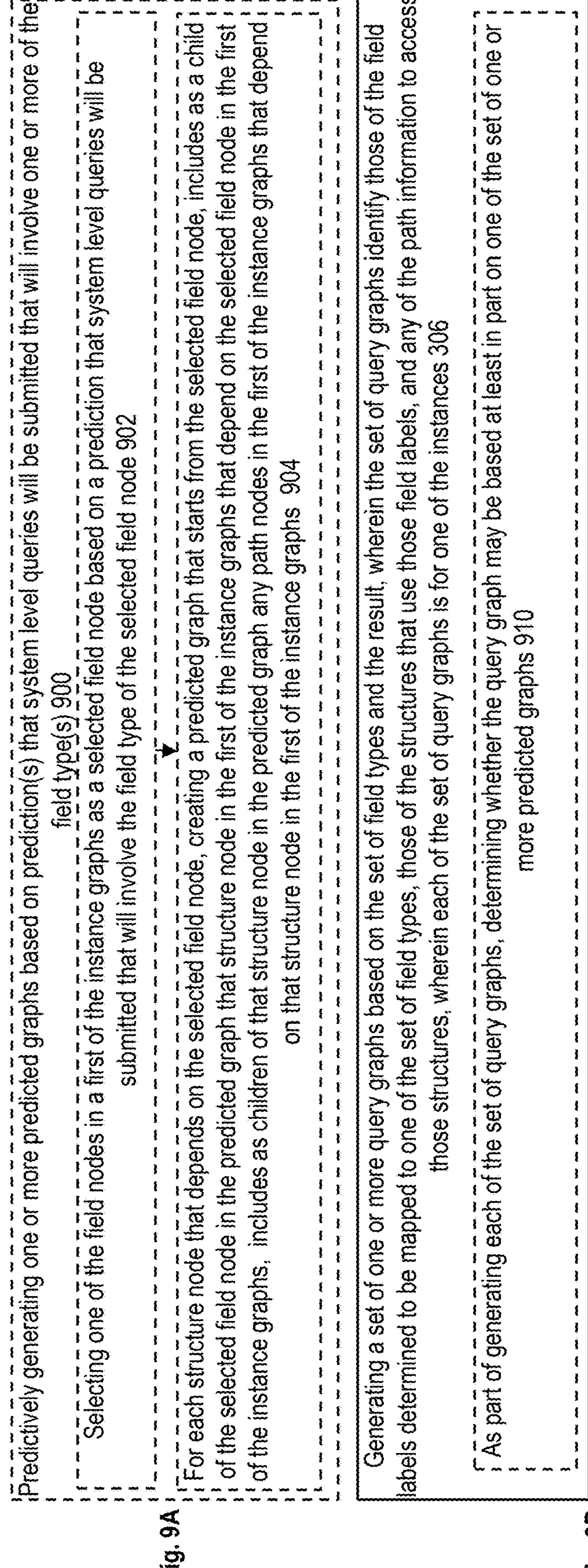
FIG. 9A is a flow diagram illustrating the generating of predicted graphs according to some embodiments.
FIG. 9B is a flow diagram illustrating an expanded view of block 306 according to some embodiments.

FIG. 9A is a flow diagram illustrating the generating of predicted graphs according to some embodiments. FIG. 9A shows block 900. In some embodiments, block 900 may be implemented as part of the flow in FIG. 3 (e.g., as part of block 300 and/or block 302, as a separate block after block 302, etc.).

Block 900 shows predictively generating one or more graphs based on prediction(s) that system level queries will be submitted that will involve one or more of the field type(s). In some embodiments, a separate "predicted graph" is generated for each structure for which there is a field node that identifies one of the predicted field type(s). A predicted graph is a graph like one of instance level query graphs 156. For instance, in embodiments in which instance level query graphs 156 are represented using field nodes, structure nodes, and path nodes, a predicted graph may be represented the same way. However, predicted graphs need not be responsive to a system level query and need to be directly used to generate instance level queries. To provide an example, assume that for structure 104A.1, a predicted graph is generated for field type 252D. The predicted graph may be represented in the same manner as the instance query graph 158A.1 of FIG. 2C. Different embodiments may make such predictions in different ways (including based on existing information, based on a history of submitted system level queries, etc.) In some embodiments, responsive to the selection of a field type, the following is performed for each instance: 1) search for a field node that identifies that field type; and 2) for each identified field node (which may or may not be shared by two or more structures in that instance), generate one predicted graph from that field node for each structure node with an edge to that field node. While some embodiments generate a separate predicted graph for each structure for which there is a field node that identifies the selected field type, alternative embodiments may be implemented to limit the number of predicted graphs generated (e.g., by predicting a subset of the instances and/or a subset of the structures for which the predicted graphs will be needed).

FIG. 9A also shows that in some embodiments that use instance graphs, block 900 may include blocks 902 and 904. Block 902 shows selecting one of the field nodes in a first of the instance graphs as a selected field node based on a prediction that system level queries will be submitted that will involve the field type of the selected field node. In the context of the previous example, assume it is predicted that there will be system level queries from which field type 252D will be identifiable. As such, assuming field node 474F (see FIG. 4A) includes field label 250F and field type 252D, field node 474F would be selected.

Block 904 shows creating, for each structure node that depends on the selected field node, a predicted graph that: 1) starts from the selected field node; 2) includes as a child of the selected field node in the predicted graph that structure node in the first of the instance graphs that depend on the selected field node in the first of the instance graphs; and 3) includes as children of that structure node in the predicted graph any path nodes in the first of the instance graphs that depend on that structure node in the first of the instance graphs. Continuing the above example with reference to FIG. 4A, field node 474F has structure node 472A.1.1 and optionally structure node 472A.1.2 as parent node(s), which in turn optionally have path node 470A as a parent node. As such: 1) a first predicted graph would include these nodes (except structure node 472A.1.2) or a copy thereof; and 2) if structure node 472A. 1.2 is present, a second predicted graph would include these nodes (except structure node 472A.1.1).

FIG. 9B is a flow diagram illustrating an expanded view of block 306 according to some embodiments. FIG. 9B shows block 306 including block 910. Block 910 shows that, as part of generating each of the query graphs, determining whether the query graph may be based at least in part on one of the set of one or more predicted graphs.

Continuing the above example, assume that a system level query is received, and from it field type 252D is identified. In this case, as part of generating the instance query graph 158A.1, it may be determined that the already generate predicted graph described above may be used (or a copied and used). As a result, the instance level query graph manager 150 need not rely on maps 130 for this instance query graph.

Thus, FIGS. 9A-B illustrate an optional optimization that reduces the time required to generate instance level query graphs 156, which in turn reduces the time required to generate instance level queries. For example, assume that it is expected that there will be many system level queries from which a given field type will be identifiable. If in such system level queries are actually received, the prior generation of predictive graph(s) for one, some, or all of the structures 232 that include a field label mapped to that given field type will improve the operation of electronic device(s) implementing such embodiments of the invention (e.g., it will save compute and time that would have been used to access the maps 130). Also, some embodiments, which implement the optimizations from FIGS. 8A-C and FIG. 9A-B, may also make use of predicted data categories to reduce the number and/or size of the predicted graphs in a similar way in which the data categories identified from system level queries may reduce the number and/or scope of instance level queries.

With reference to FIG. 1, in some embodiments query distributor 100 includes logic (which is part of instance level query graph manager 150, part of another component, or a separate predictive generator component) that generates a set of one or more predicted graphs based on a prediction that system level queries will be submitted that will involve the field type of a selected one of the field nodes. In addition, instance level query manager 160, for each of the query graphs, determines whether the query graph may be based at least in part on one of the set of one or more predicted graphs.

FIG. 10A is a block diagram illustrating exemplary implementations of the map generator according to some embodiments. FIG. 10A shows map generator 110 including a field label matcher 1000 and/or a data interrogator 1010.

Field label matcher 1000 attempts to match the field labels in the set of structures of the set instances to one field labels in existing sets of one or more field labels. Each of the existing sets was previously assigned a respective one of the plurality of field types. By way of example, FIG. 10A shows matching structure(s) 1002 including a first matching structure 1004. First matching structure 1004 includes: 1) a field type column 1006 to store the plurality of field types; and 2) a field label(s) column 1008 to store the respective sets of field labels for the plurality of field types.

In some embodiments, field label matcher 1000 includes a strict matcher 1012 and/or a fuzzy matcher 1014. Strict matcher 1012 is to attempt to strictly match field labels in the set of structures of the set instances to one of the field labels in the existing sets of one or more field labels. For instance, if field label 250A in instance 232A.1.1 is "d_port," then strict matcher 1012 would find a match in the 3rd row of filed label(s) column 1008 of first matching structure 1004. As a result, the field label 250A of "d_port" would be mapped to the field type "DestinationPort."

Fuzzy matcher 1014 is to attempt to fuzzy match field labels in the set of structures to one of the field labels in the existing sets of one or more field labels. For instance, if field label 250A in instance 232A.1.1 is "destin_port," then fuzzy matcher 1014 may find a match in the 3rd row of field label(s) column 1008 of first matching structure 1004. If so, the field label 250A of "destin_port" would be mapped to the field type "DestinationPort."

Some embodiments perform the fuzzy match using a Levenshtein distance. The probability distribution of matches is compared to the currently selected field label from the structure. The currently selected field label is considered to be a match when there is one relatively high probability match (any other matches are low probability matches). When there is a match: 1) the instance map is updated; and 2) the currently selected field label is added to the set of field labels for that field type (so it will strict match if the currently selected field label appears in another structure). This adding of field labels to the set of field labels for the field type is a form of learning, and an optimal optimization.

Some embodiments perform fuzzy matches for only those of the field types in field type column 1006 that have more than a threshold number M (e.g., more than 2, and in some embodiments, it is 5 or more) of field labels in the respective set of field labels in field label(s) column 1008. To provide an example, assuming the threshold is 3 or more, only the field types Destination IPv4Address, DestinationPort, SourceIPv4Address, DNSDomain, and User in first matching structure 1004 would qualify. In the above "destin_port" example, assuming a fuzzy match, the field label "destin_port" would be added to the set of field labels for the field type DestinationPort in some embodiments. This adding of field labels to the set of field labels for the field type is a form of learning, and an optimal optimization.

The threshold is a mechanism to increase the level of confidence of a fuzzy match. While some embodiments use such a threshold, other embodiments use a different mechanism or do not use such a mechanism.

In some embodiments, for each field label from a structure, the strict matcher 1012 is attempted first. If there is no match, then an attempt is made with fuzzy matcher 1014.

Data interrogator 1010: 1) accesses sample data associated with a field label in a structure; and 2) attempt to determine one of the plurality of field types from that sample data based on regexes for respective ones of the plurality of field types. By way of example, FIG. 10A shows matching structure(s) 1002 including a second matching structure 1016. Second matching structure 1016 includes: 1) a field type column 1006 to store at least some (those field types for which the data has a distinguishing format, such as an IP address, email address, MD5, etc.) of the plurality of field types; and 2) a regex column 1018 to store a respective regex. While FIG. 10A shows field types that end with "_regex," this is a design choice and alternative embodiments do not distinguish or distinguish another way the field types that matched by strict and/or fuzzy match from those that matched by data interrogation.

To provide additional detail, the relationship between a label field and a set of one or more data fields means that the label field storage of that label field is to store a field label (metadata) regarding the set of data fields (and thus, the data field data within those data fields). In some cases, the data field data in a set of data fields share a distinguishable format. In other words, the format of the data allows for the identification of one of the Field Types. In this case, identifying the format of the data field data in the data fields may be used to indirectly determine the field type.

In some embodiments, for the currently selected field label, the sample data is accessed from a number of V data fields in the structure associated with the currently selected field label. In some embodiments, this number is between 10 and 30; and in some specific embodiments it is 20. Also, in some embodiments it is the data field data from the V most recently added data fields. While some embodiments use the V most recently added pieces of data field data, other embodiments use a different sample of data.

In some embodiments, for each field label from a structure, the order of operation is: 1) strict matcher 1012; 2) if there is not a match, then fuzzy matcher 1014; and 3) if there is still not a match, then data interrogator 1010. However, other embodiments use a different order and/or more, less, or different matchers.

Also, in some embodiments that perform field label matching (e.g., see field label matcher 1000) and data interrogation (e.g., see data interrogator 1010), when the accessed field label from the structure is successfully matched to a field type using data interrogation, the accessed field label is added to the existing set of field labels for the determined field type (e.g., to the set of field labels in field label(s) column 1008 at the row for the determined field type). This is like the above discussed optional optimization that adds the accessed field label on a successful fuzzy match. When either of these triggers cause the addition of the accessed field label, such embodiments become adaptive in that they can learn new field labels. In particular, the automatic addition of an automatically learned field label means that: 1) if that field label is seen again in the future, it will provide a strict match; and 2) if a similar field label is seen, the chances of a fuzzy match will be improved (e.g., addition of a field label may: A) allow a given set of field labels to exceed the threshold described above, and thus allow for attempting a fuzzy match; and/or B) improve the likelihood of matching using a fuzzy match because more data can improve the accuracy of fuzzy matching). Thus, while an administrator may manually add field labels, this automated learning simplifies maintenance and improves performance of the electronic device(s) implementing the embodiments (e.g., a strict match requires less compute/time/power as compared to a fuzzy match, and less compute/time/power/network bandwidth as compared to data interrogation; also a fuzzy match requires less compute/time/power/network bandwidth than data interrogation).

Also, some embodiments use data interrogator 1010 after finding a match with strict matcher 1012 and/or fuzzy matcher 1014; the result is used to increase the level of confidence regarding the match. For example, assume that a field label in a structure is "e - - - mail," and assume strict matcher 1012 does not find a match for "e - - - mail," but fuzzy matcher 1014 finds a match for "e - - - mail" is the field type "Email," then sample data field data associated with field label "e - - - mail" may be accessed from that structure and provided to data interrogator 1010. Data interrogator 1010 may be implemented to: 1) lookup a regex for the fuzzy matched field type "Email," and apply it to the sample data to see how many match; or 2) apply all of the regexes to the same data to see if "Email" is the best match.

While first matching structure 1004 and second matching structure 1016 are illustrated as tables, embodiments may implement such data structures in a variety of ways.

Figure 10B:
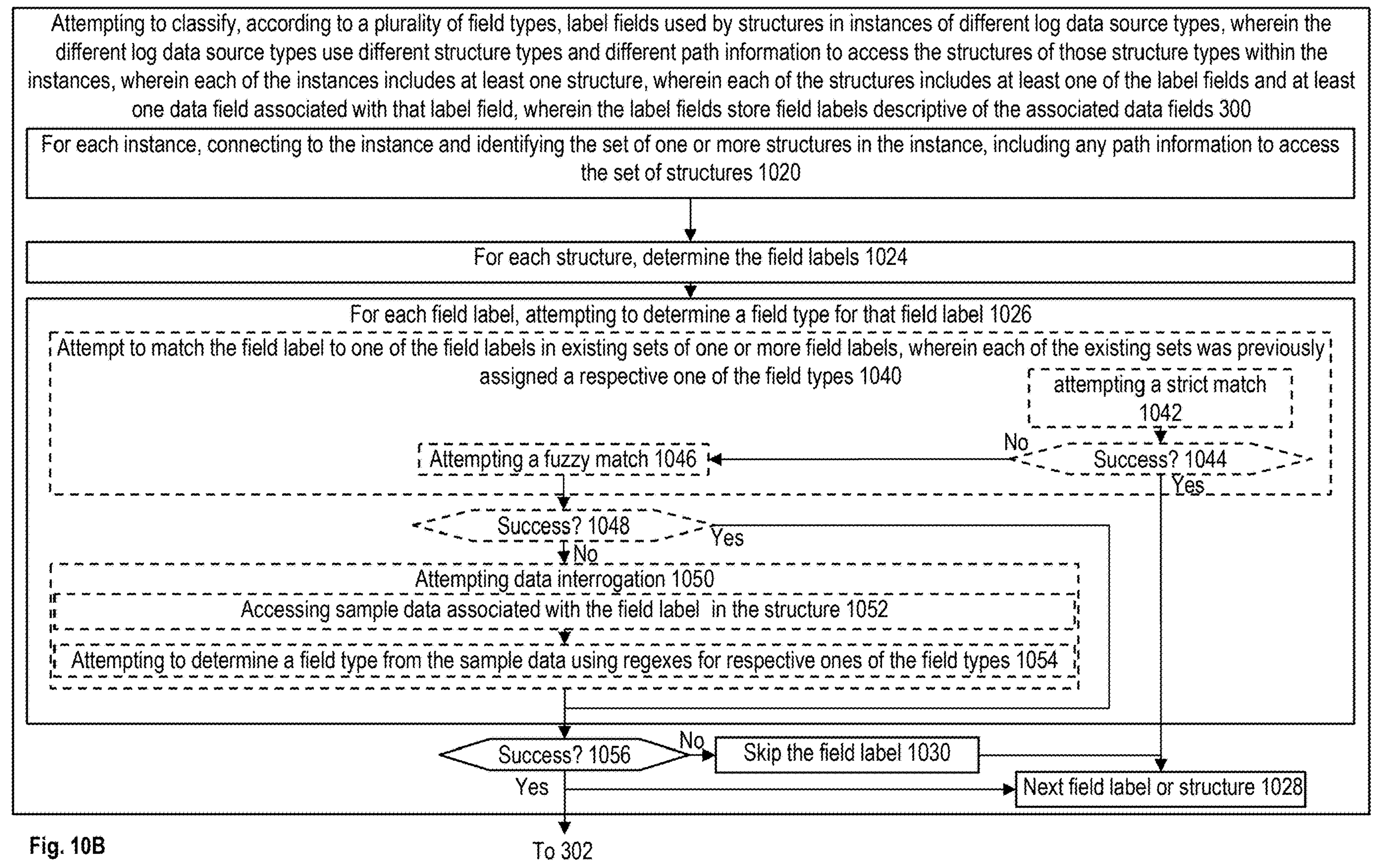
FIG. 10B is a flow diagram illustrating an expanded view of block 300 according to some embodiments.

FIG. 10B is a flow diagram illustrating an expanded view of block 300 according to some embodiments. FIG. 10B starts with block 1020.

Block 1020 shows, for each instance, connecting to that instance and identifying the set of one or more structures in that instance, including any path information to access the set of structures as part of generating each of the query graphs.

Block 1024 shows, for each structure in that instance, determining the field labels.

Block 1026 shows, for each field label, attempting to determine a field type for that field label. With reference to FIG. 1, blocks 1020-1026 may be performed by map generator 110. From block 1026, control passes to block 1056 (however, if block 1040 (described later herein) is implemented, then control may alternatively pass to block 1028).

Block 1056 shows determining whether a field type was successfully determined for the current field label. If so, control passes to block 302 (to store the mapping) and block 1028 if there are more field labels or structures to process. Otherwise, control passes to block 1030.

Block 1030 shows skipping the field label. While not shown, in some embodiments the field label is still stored in the instance map, but there is no field type added.

Block 1028 shows the selection of the next field label or structure for processing according to block 1026. While some embodiments serially process the field labels and structure, alternative embodiments may overlap some of the processing (e.g., process multiple field labels from a given structure in parallel, process different structures in parallel, process different instances in parallel, and/or process different log data source types in parallel).

Block 1026 is shown including optional blocks 1040 through 1054. Block 1040 shows attempting to match the field label to one of the field labels in existing sets of one or more field labels, where each of the existing sets was previously assigned a respective one of the plurality of field types. Block 1040 is shown including optional blocks 1042, 1044, and 1046. From block 1040, control passes to: 1) block 1048 if block 1050 is implemented; 2) potentially block 1028 if block 1044 is implemented; or 3) block 1056.

Block 1042 shows attempting to perform a strict match. If the strict match is determined to have been successful in block 1044, control passes to block 1028. Otherwise, control passes to block 1046 in which a fuzzy match is attempted. Form block 1046 control passes to: 1) block 1048 if block 1050 is implemented; or 2) block 1056.

Block 1048 shows determining whether a field type was successfully determined for the current field label. If so, control passes to block 1056. Otherwise, control passes to block 1050.

Block 1050 shows attempting data interrogation, and control passing to block 1056.

Block 1050 is shown as optionally including block 1052 and 1054. Block 1052 shows accessing sample data associated with the field label in the structure, while block 1054 shows attempting to determine a field type from the sample data using regexes for respective ones of the field types.

With reference to FIG. 10A, blocks 1040, 1042, 1046, and 1050 may be respectively performed by field label matcher 1000, strict matcher 1012, fuzzy matcher 1014, data interrogator 1010.

FIG. 11A is a table illustrating roles of nodes and fields of those nodes according to some embodiment. The first column of the table shows a row for each of the following fields: name, type, data category, node role, and id. The 5 remaining columns identify the following roles: root node/level 1 path node; intermediate node/level N path node; last level path node/structure node; a combination of root node and last level path node/structure node; and leaf node/field node. The intersections of these columns and rows (referred to as cells) indicate whether and how the fields may be used by nodes depending on role according to some embodiments. Cells with complete solid outlines are required in some embodiments, while cells with at least one dashed border are optional in that the functionality is provided another way and/or is not needed in some embodiments. For example, the "node role" may be used to store a representation of a given node's role; and thus may be used, for instance, to locate all root nodes. However, alternative embodiments may use a different mechanism (e.g., keep a separate list of references that identify the nodes performing a particular role). To provide another example, for row 1 of the table of FIG. 2B: 1) the root node would have Name: <database name> and Type: Database; and 2) a structure node would have Name: <table name> and Type: Table. Additional examples are provided in the following figures.

FIG. 11B is a block diagram illustrating an example instance graph according to some embodiments of the invention. The nodes of the instance graph are shown including just some of the fields from the table in FIG. 11A to simplify understanding. Also, brackets on the left are used to designate the roles of different ones of the nodes as: root node(s), structure node(s), and field node(s).

FIG. 11B illustrates instance graph 1110. It is shown including a single root node, two dependent structure nodes, where the structure nodes have as dependents a shared field node as well as non-shared field nodes. It was generated for an instance of a relational database referenced as db1.ex.example. Thus, the log data source type is relational database (see row 1 from the table in FIG. 2B), and therefore the "Type" field of the root node and structure nodes respectively store "Database" and "Table."

Also, some of the field nodes of the two structures have the same contents in the "Type" field, while they have different contents in the "Name" field (e.g., both structures have a field node that has "DestinationPort" stored in the "Type" field, but have different contents in the "Name" field-"dest_port" vs "destination_port"). This reflects different structures in the same instance using different field labels, but the mappings for each maps those field labels to the same field type.

In addition, instance graph 1110 includes data categories generated per the optional data category optimization described above. In particular, the structure nodes on the left and right are respectively assigned Firewall and Proxy Traffic, and thus the root node that depends on those structure nodes is assigned as data categories both Firewall, Proxy Traffic (the combination of data categories assigned the root node's descendant nodes in the graph).

FIG. 11C is a block diagram illustrating a second example instance graph according to some embodiments of the invention. FIG. 11C shows instance graph 1120, which is like instance graph 1110. While not required, some similarities include that both instance graphs have one root node and two structures, where: 1) the structure nodes have as dependents a shared field node as well as non-shared field nodes; and 2) the structure nodes in the same locations have the same data categories assignments; and 3) the root node has the same data category assignments.

One difference is that instance graph 1120 was generated for an instance of Splunk referenced as ex.splunkcloud.example 1. Thus, the log data source type is Splunk (see row 3 from the table in FIG. 2B), and therefore the "Type" field of the root node and structure nodes respectively store "Index" and "sourcetype."

Another difference is the contents of the "Name" fields of the nodes are different, except for a few to show they may be the same (e.g., one of the field nodes in both instance graphs stores "dest_port" in the "Name" field).

Finally, some of the field nodes in the instance graphs have the same contents in the "Type" field, while they have different contents in the "Name" field (e.g., both instance graphs have a field node with "SourcePort" stored in the "Type" field, but different contents in the "Name" field-"src_port" vs "source_port"). This reflects different structures in different instances of different log data source types using different field labels, but the mappings for each map those field labels to the same field type.

FIG. 11D is a block diagram illustrating a third example instance graph according to some embodiments of the invention. FIG. 11D shows instance graph 1130, which is like instance graph 1120. While not required, some similarities include that both instance graphs have one root node and two structures, where the structure nodes have as dependents a shared field node as well as non-shared field nodes.

One difference is that instance graph 1130 was generated for a different instance of Splunk referenced as ex.splunkcloud.example 2. As shown, the "Type" fields of the root and structure nodes are the same as instance graph 1120, but the content in the "Name" fields and assigned data categories differ (the data category of the left and right structure nodes are respectively "Mail" and "Process," and thus the data categories of the root node are "Mail, Process").

Another difference is the contents of the "Name" fields of most of the field nodes are different to show that the field labels used in structures of different instances of the same log data source type may differ.

As before, some of the field nodes in the instance graphs have the same contents in the "Type" field, while they have different contents in the "Name" field (e.g., both instance graphs have a field node with "DestinationIPv4Address" stored in the "Type" field, but different contents in the "Name" field-"dest_ip" vs "destination_ip"). This reflects different structures in different instances of the same log data source types using different field labels, but those field labels are mapped to the same field type.

Example System Level Queries

Several example system level queries follow that are based on the instance graphs in FIGS. 11B-C (FIG. 11D is not included in these examples).

FIG. 12 is a block diagram illustrating an exemplary system level query and the resulting instance level queries according to some embodiments. FIG. 12 shows a system level query 1200 that is "dest_endpoint.ip=3.3.3.3." FIG. 12 assumes that this is submitted in a system that has the exemplary instance graphs 1110 and 1120. By way of example, it is assumed that in response to submission of the system level query 1200, it is determined to include the field label "dest_endpoint.ip" through a strict match, and thus identify the field type "DestinationIPv4Address" (e.g., the system level query 1200 may be parsed to find "dest_endpoint.ip," which can be found in the set of field labels in the 2nd row under the field label(s) column 1008 of first matching structure 1004, and the field type column 1006 for this row is "DestinationIPv4Address").

Based on this field type, the instance graphs 1110 and 1120 are accessed to identify that each include a field node that indicates this field type. These field nodes are used to generate query graphs 1210 and 1220 respectively from instance graphs 1110 and 1120. Query graphs 1210 and 1220 are illustrated in comparable manner to the instance graphs 1110 and 1120. The main difference being that they each have the identified single field node, as well as the paths (the edges, structure node(s)) to the root node.

Based on query graphs 1210 and 1220, the following instance level queries 1230 are generated: select * from firewall_table where dest_ip-3.3.3.3; select * from proxy_table where dest_ip-3.3.3.3; and index=security (sourcetype=firewall OR sourcetype-web_proxy) destination_ip=3.3.3.3. The first two instance level queries are sent to the instance (referenced by db1.ex.example) from which instance graph 1110 was generated and for which query graph 1210 was generated. The third instance level query is sent to the instance (referenced by ex.splunkcloud.example 1) from which instance graph 1120 was generated and for which query graph 1220 was generated.

Thus, a single system level query is converted into different instance level queries for submission to different instances of different log data source types.

Figure 13A:
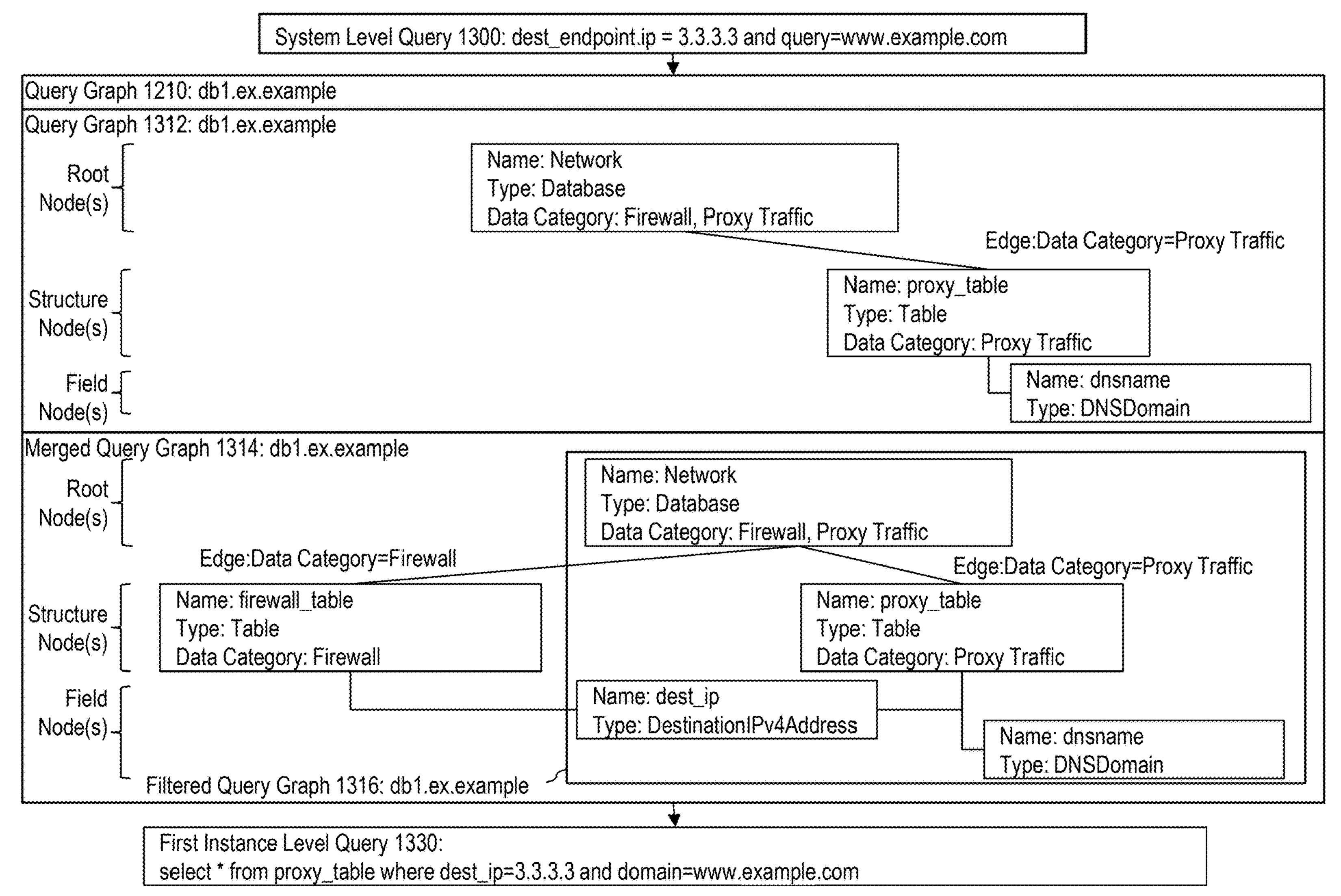
FIG. 13A is a block diagram illustrating an exemplary system level query and half of the resulting instance level queries according to some embodiments.

FIG. 13A is a block diagram illustrating an exemplary system level query and half of the resulting instance level queries according to some embodiments. FIG. 13A is like FIG. 12. FIG. 13A shows a system level query 1300 that is "dest_endpoint.ip=3.3.3.3 and query=www.example.com." FIG. 13A also assumes that this is submitted in a system that has the exemplary instance graphs 1110 and 1120. By way of example, it is assumed that in response to submission of the system level query 1300, it is determined to: 1) include the field label "dest_endpoint.ip," and from that identify the field type "DestinationIPv4Address" as described above; and 2) identify field type "DNSDomain" from "query=www.example.com" (e.g., the system level query 1300 may be parsed to find the item is a combination of a field label ("query"), condition, and data ("www.example.com"); and then attempt a field label match (e.g., a strict and/or fuzzy match) using the field label ("query"); if there is a match, then use the mapping; if there is not a match, then attempt to perform data interrogation on the data ("www.example.com" using the domain_regex in FIG. 10A)).

FIG. 13A shows embodiments that generate an initial query graph for each field type, and then merges them to generate the final query graph. FIG. 13A shows this process for instance graph 1110. In particular, query graph 1210 is generated as described above based on the field type "DestinationIPv4Address." Based on the "DNSDomain" field type, the instance graphs 1110 is accessed and one field node is identified that indicates this field type. This field node is used to generate query graph 1312. Query graphs 1312 is illustrated in comparable manner to instance graph 1110. The main difference being that it identifies the single field node, as well as the path (the edges, structure node) to the root node.

The query graphs 1210 and 1312 are merged to form merged query graph 1314, which includes both structure nodes. From merged query graph 1314, a filtered query graph 1316 is generated that includes only the structure node on the right because it includes all of the set of field types identified from the system level query 1300 (the structure node on the left is excluded because it does not include the field type "DNSDomain).

Based on filtered query graphs 1316, the following first instance level query 1330 is generated: select * from proxy_table where dest_ip-3.3.3.3 and domain=www.example.com. As before, this first instance level query 1320 is sent to the instance (referenced by db1.ex.example) from which instance graph 1110 was generated and for which filtered query graph 1316 was generated.

FIG. 13B is a block diagram illustrating the exemplary system level query and the other half of the resulting instance level queries according to some embodiments. FIG. 13B is similar to FIG. 13A in that it: 1) shows the system level query 1300; 2) assumes a system that has the exemplary instance graphs 1110 and 1120; 3) assumes the same two field types are identified from the system level query 1300; and 4) shows embodiments that generate an initial query graph for each field type, and then merges them to generate the final query graph. However, FIG. 13B shows this process for instance graph 1120. In particular, query graph 1220 is generated as described above based on the field type "DestinationIPv4Address." Based on the "DNSDomain" field type, the instance graph 1120 is accessed and one field node is identified that indicates this field type. This field node is used to generate query graph 1322. Query graph 1322 is illustrated in comparable manner to the instance graph 1110; the main difference being that it identifies the single field node, as well as the path (the edges, structure node) to the root node.

The query graphs 1220 and 1322 are merged to form merged query graph 1324, which includes both structure nodes. From merged query graph 1324, a filtered query graph 1326 is generated that includes only the structure node on the right because it includes all of the set of field types identified from the system level query 1300 (the structure node on the left is excluded because it does not include the field type "DNSDomain).

Based on filtered query graphs 1326, the following second instance level query 1332 is generated: index=security sourcetype=web_proxy destination_ip=3.3.3.3 and dnsname=www.example.com. As before, this second instance level query 1332 is sent to the instance (referenced by ex.splunkcloud.example 1) from which instance graph 1120 was generated and for which filtered query graph 1326 was generated.

Thus, the combination of FIGS. 13A and 13B illustrate a single system level query being converted into different instance level queries for submission to different instances of different log data source types. As compared to FIG. 12, FIGS. 13A and 13B illustrate a system level query with more than one item: 1) which leads to the identification of more than one field type, which leads to (in the example shown) exclusion of structure nodes that do not include all of the field types; and 2) which leads to instance level queries 1330 and 1332 that include more than one item.

FIG. 14 is a block diagram illustrating a third exemplary system level query and the resulting instance level queries according to some embodiments. FIG. 14 is like FIG. 12. FIG. 14 shows a system level query 1400 that is "Search my firewall for connections to 3.3.3.3." FIG. 14 also assumes that this is submitted in a system that has the exemplary instance graphs 1110 and 1120. By way of example, it is assumed that in response to submission of the system level query 1400, it is determined: 1) that it includes the data category "Firewall"; and 2) that the field type "DestinationIPv4Address" is identified (e.g., the system level query 1200 may be parsed to find "to" and "3.3.3.3," where: A) "3.3.3.3" can be found in to match via data interrogation the regex in the 3rd row under the regex column 1018 of second matching structure 1016, and the field type column 1006 for this row is "IPv4Address_regex;" B) in some embodiments, this is a field type that includes other field types—in particular "SourceIPv4Address" and "DestinationIPv4Address;" and C) but based on the "to" in the query, the field type is narrowed down to "DestinationIPv4Address").

Based on this field type, as in FIG. 12, the instance graphs 1110 and 1120 are accessed to identify that each include a field node that indicates this field type. These field nodes are used to generate query graphs 1210 and 1220 respectively from instance graphs 1110 and 1120. Based on the data category "Firewall" in the system level query 1400, filtered query graphs 1416 and 1426 are determined based on query graphs 1210 and 1220. In particular, the right structure node in each of the query graphs 1210 and 1220 is excluded because it does not identify the data category "Firewall."

Based on filtered query graphs 1416 and 1426, the following instance level queries 1430 are generated: select * from firewall_table where dest_ip-3.3.3.3; and index=security sourcetype-firewall destination_ip=3.3.3.3. The first is sent to the instance (referenced by db1.ex.example) from which instance graph 1110 was generated and for which filtered query graph 1416 was generated; while the second is sent to the instance (referenced by ex.splunkcloud.example 1) from which instance graph 1120 was generated and for which filtered query graph 1426 was generated.

Thus, like FIG. 12, FIG. 14 shows a single system level query being converted into different instance level queries for submission to different instances of different log data source types. However, FIG. 14 shows: 1) an example of a non-SQL query; 2) an example of the use of a data category; and 3) an example of the use of data interrogation to identify from the system level query a field type.

The instance level queries generated by the examples shown in each of FIGS. 12-14 would result in query results being received from the queried instances. These query results would provide data field data from each queried structures/instances/data source types. As such, a user or application using the described embodiments can collect the data field data from multiple different log data source types in response to a single query, and this data field data may be analyzed to handle a variety of use cases, such as those described above.

Example High Level System Level Query

As previously described, some embodiments may support the submission of a high level system level query that is converted into (or used to generate) a set of one or more low level system level queries. Recall the example of the high level system level query "tell me if I have evilguy malware on my network" (where evilguy would be the name of known malware and considered a high level item). In response to receiving the high level system level query, the high level system level query may be parsed to identify the high level item(s) (e.g., evilguy), and the high level item(s) may be analyzed to determine low level system level queries that include low level items.

To provide additional detail, some embodiments may, in response to the high level system level query, do the following: 1) create a ticket in the submitter's ticketing system; 2) generate the following low level system level queries: a) dest_endpoint.ip=3.3.3.3; b) dest_endpoint.ip=3.3.4.5 and query=evilguy.com; and c) search my firewall for connections to 4.4.4.4; 3) for each of these low level system level queries, generate and submit a set of one or more instance level queries and receive in response a set of one or more instance level query results; 4) store the instance level query results; 5) return the created ticket with, for each of the instance level queries, the instance level query, its purpose, and the number of results; 6) analyze the query results and render a verdict on whether this is an active threat; and 7) transmit (e.g., cause a GUI to be displayed by a user device for viewing by the submitter) the verdict, and if the verdict is active, the associated identities and assets associated with the threat. As previously described, in some embodiments query distributor 100 is a component in a larger service/application, in which case one or more other components of the larger service/application may perform the above steps 1 and 5-7.

To provide even more detail, assume that for step 3 above, the low level system level queries are determined to involve field types DestinationIPv4Address and DNSdomain. Based on this, assume in this example that there is one instance of each of two log data source types that involve these field types: 1) one being an instance of Splunk, for which the following instance level queries (note that a space indicates an implicit "and" operation in these queries) are generated: a) index=security (sourcetype=firewall OR sourcetype=web_proxy) destination_ip=3.3.3.3; b) index=security sourcetype=web_proxy destination_ip=3.3.4.5 and dnsname=www.evilguys.com; c) index=security sourcetype=firewall destination_ip-4.4.4.4; and 2) the other being an instance of Athena, for which the following instance level queries are generated: a) select * from firewall_table where dest_ip=3.3.3.3; b) select * from proxy_table where dest_ip=3.3.3.3; c) select * from proxy_table where dest_ip=3.3.4.5 and domain=www.evilguys.com; and d) select * from firewall_table where dest_ip=4.4.4.4.

An example of information returned in the created ticket may include, for the instance level query select * from firewall_table where dest_ip=4.4.4.4, the following: a) "Queried Athena: This query searches your firewall data for connections to 4.4.4.4;" b) "3 results| Detailed results" (where "Detailed results" is a link that allow the submitter to view the instance level query results for this instance level query; c) "Query syntax: select * from firewall_table where dest_ip=4.4.4.4."

An example of the analysis in step 6 may include determining from the query results the identities and assets for which the active threat was found. In other words, assume that the query results include data fields for label fields for which the field labels are of the field types User and Hostnames (e.g., in FIG. 11B, the field nodes with "Name: src_user Type: User" and "Name: computer Type: Hostname"; in FIG. 11C, the field nodes with "Name: username Type: User" and "Name: computername Type: Hostname"). Assume that the result of the instance level query 'select * from proxy_table where dest_ip=3.3.4.5 and domain=www.evilguys.com' contains the following 2 results. The first result is dest_ip-3.3.4.5, source_ip=192.168.3.3, src_user-goodguy1@goodplace.com, computer=goodguy1-laptop.goodplace.com, destination_port=80, url=http://www.evilguys.com/c2 and the second result is dest_ip=3.3.4.5, source_ip=192.168.3.4, src_user=goodguy2@goodplace.com, computer-goodguy2-laptop.goodplace.com, destination_port=80, url=http://www.evilguys.com/c2. The system can use the fact that a User field and a Hostname field is in the result set to identify identities and assets.

An example of the GUI from step 7 may display: a) "Active Threat Found. Evidence gathered from 7 queries across 2 platforms," where platforms refers to a log data source type; b) "The following identities are associated with this threat:"; c) below this "goodguy1@goodplace.com" and "goodguy2@goodplace.com;" d) "The following assets are associated with this threat:"; and e) below this "goodguy1-laptop.goodplace.com" and "goodguy2-laptop.goodplace.com."

Example Electronic Devices and Environments

Electronic Device and Machine-Readable Media

One or more parts of the above embodiments may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all the instructions in that program.

An electronic device (also referred to as a device, computing device, computer, machine, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals-such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 15:
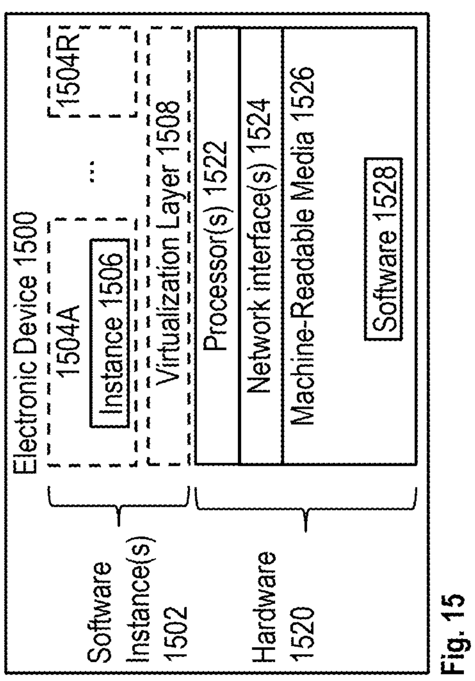
FIG. 15 is a block diagram illustrating an electronic device 1500 according to some example embodiments.

FIG. 15 is a block diagram illustrating an electronic device 1500 according to some example embodiments. FIG. 15 includes hardware 1520 comprising a set of one or more processor(s) 1522, a set of one or more network interfaces 1524 (wireless and/or wired), and machine-readable media 1526 having stored therein software 1528 (which includes instructions executable by the set of one or more processor(s) 1522). The machine-readable media 1526 may include non-transitory and/or transitory machine-readable media. Each of the previously described clients and the query distributor may be implemented in one or more of electronic device 1500. In one embodiment: 1) each of the clients is implemented in a separate one of the electronic device 1500 (e.g., in end user devices where the software 1528 represents the software to implement clients to interface directly and/or indirectly with the query distributor (e.g., software 1528 represents a web browser, a native client, a portal, a command-line interface, and/or an application programming interface (API) based upon protocols such as Simple Object Access Protocol (SOAP), Representational State Transfer (REST), etc.)); 2) the query distributor is implemented in a separate set of one or more of electronic device 1500 (e.g., a set of one or more server devices where the software 1528 represents the software to implement the query distributor); and 3) in operation, the electronic devices implementing the clients and the query distributor would be communicatively coupled (e.g., by a network) and would establish between them (or through one or more other layers and/or or other services) connections for submitting system level queries to the query distributor and returning the above described results back to the clients. Other configurations of electronic devices may be used in other embodiments (e.g., an embodiment in which the client and the query distributor are implemented on a single one of electronic device 1500).

During operation, an instance of software 1528 (illustrated as instance 1506 and referred to as a software instance; and in the more specific case of an application, as an application instance) is executed. In electronic devices that use compute virtualization, the set of one or more processor(s) 1522 typically execute software to instantiate a virtualization layer 1508 and a set of one or more software containers, shown as software container 1504A to software container 1504R (e.g., with operating system-level virtualization, the virtualization layer 1508 may represent a container engine (such as Docker® Engine container runtime by Docker, Inc. or Red Hat® OpenShift container runtime by Red Hat, Inc.) running on top of (or integrated into) an operating system, and it allows for the creation of multiple software containers (representing separate user space instances and also called virtualization engines, virtual private servers, or jails) that may each be used to execute a set of one or more applications; with full virtualization, the virtualization layer 1508 represents a hypervisor (sometimes referred to as a virtual machine monitor (VMM)) or a hypervisor executing on top of a host operating system, and the software containers each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1528 is executed within the software container 1504A on the virtualization layer 1508. In electronic devices where compute virtualization is not used, instance 1506 on top of a host operating system is executed on the "bare metal" electronic device 1500. Instances of the software 1528, as well as the virtualization layer 1508 and the software containers if implemented, are collectively referred to as software instance(s) 1502.

Alternative embodiments of an electronic device may have numerous variations from those described above. For example, customized hardware and/or accelerators might also be used in an electronic device.

Environments

Different embodiments may deploy the query distributor (or a larger application of which the query distributor is a component) in a number of different ways. For example, as previously described, some embodiments require a relatively small amount of compute and storage, meaning an embodiment may be deployed in a customer's environment (also referred to as a customer managed production environment) as opposed to having to be offered as a cloud service. For example, the query distributor (or a larger application of which the query distributor is a component) may be deployed in a virtual private cloud (VPC), which is a public cloud offering that lets an enterprise (the customer) establish its own private cloud-like computing environment on shared public cloud infrastructure. By way of particular example, the query distributor (or a larger application of which the query distributor is a component) may be: 1) deployed as a containerized application (e.g., as a Docker container) within a VPC within a data center of a cloud provider; 2) be coupled to and accessed through an internet gateway and application load balancer (APL) that are also deployed within that data center; 3) be coupled to storage (e.g., for storing container images for the containerized application); and 4) be coupled to receive log data from different log data sources types. A network of the customer may include various electronic devices (e.g., server devices, end users devices, network devices, etc.) that generate log data and/or data collected for logs by one or more instances of one or more other log data source types. The network of the customer may be on-prem, in the cloud (hosted by the same cloud provider as the VPC or in another couple provider's cloud), or both. Instances of a log data source type like Splunk, which is collecting data from the electronic devices in the network of the customer, may be deployed in a variety of ways (e.g., hosted by Splunk, customer hosted instance(s) in the cloud, and/or on prem. Similarly, an instance of a log data source type that is a database may be deployed in a variety of ways (e.g., an instance of Athena may be hosted in the same data center as the VPC and be coupled to both the network of the customer and the VPC). One or more users associated with the customer may interact with the containerized application as described above.

CONCLUSION

In the above description, numerous specific details such as resource partitioning/sharing/duplication embodiments, types and interrelationships of system components, and logic partitioning/integration choices are set forth to provide a more thorough understanding. The invention may be practiced without such specific details, however. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, and/or characteristic is described in connection with an embodiment, one skilled in the art would know to affect such feature, structure, and/or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain embodiments, such order is exemplary and not limiting (e.g., alternative embodiments may perform the operations in a different order, combine certain operations, perform certain operations in parallel, overlap performance of certain operations such that they are partially in parallel, etc.).

While the above description includes several example embodiments; the invention is not limited to the embodiments described and can be practiced with modification and alteration within the spirit and scope of the appended claims. The description is thus illustrative instead of limiting.

What is claimed is:

1. A computer implemented method to query across different log data source types, the method comprising:

attempting to classify, according to a plurality of field types, label fields used by structures in instances of different log data source types, wherein the different log data source types use different structure types and different path information to access the structures of those structure types within the instances, wherein each of the instances includes at least one structure, wherein each of the structures includes at least one of the label fields and at least one data field associated with the at least one of the label fields, wherein the label fields store field labels descriptive of the associated data fields;

responsive to submission of a system level query, generating a set of one or more instance level queries based on a result of the attempting and a set of one or more of the plurality of field types involved in the system level query;

submitting the set of one or more instance level queries to a set of one or more of the instances;

receiving a set of one or more instance level query results responsive to the submitting; and transmitting the instance level query results as a response to the submission of the system level query.

2. The method of claim 1, wherein the result comprises for each instance, an instance graph with the path information and the mappings for a set of one or more of the structures in that instance.

3. The method of claim 1, further comprising:

parsing the system level query to identify a set of one or more items, wherein the items include at least:

one of the field labels;

one of the plurality of field types;

data; or a combination of one of the field labels, a condition, and data; and for each of the items that does not include one of the plurality of field types, performing the following:

attempting to determine one of the plurality of field types for the item; and when the item includes one of the plurality of field types or one of the plurality of field types was determined for the item, adding that field type to the set of field types for the system level query.

4. The method of claim 1, wherein the generating the set of one or more instance level queries comprises:

generating a set of one or more query graphs based on the set of one or more of the plurality of field types and the result, wherein the set of one or more query graphs identify those of the field labels determined to be mapped to one of the set of one or more of the plurality of field types, those of the structures that use those field labels, and the path information to access those structures, wherein each of the set of one or more query graphs is for one of the instances.

5. The method of claim 4, wherein the generating the set of one or more instance level queries comprises:

as part of generating each of the set of query graphs:

generating an initial query graph for each of the field labels in the set of field labels determined to be included in the instance for which the query graph is being generated, wherein each of the initial query graph includes:

a field node that includes a mapping of one of the field labels to one of the set of one or more of the plurality of field types;

a set of one or more structure nodes representing a respective set of one or more of the structures that are in the instance and that include the one of the field labels, wherein the set of structure nodes depend on the field node; and any path nodes needed to identify path information to reach the set of structures in the instance for which the query graph is being generated; and when there is more than one initial query graph for the instance for which the query graph is being generated, merging the initial query graphs to form the query graph.

6. The method of claim 5, wherein the generating the set of one or more instance level queries comprises:

for at least one of the structure nodes from which depends a set of one or more field nodes representing mappings for every one of the set of one or more of the plurality of field types identified from the system level query, generating one of the set of instance level queries based on the set of field nodes, the at least one structure node of the structure nodes, and any path information in any path nodes on which the structure node depends directly or indirectly.

7. The method of claim 4, wherein the generating the set of one or more instance level queries comprises:

from each of the query graphs, generating one of the set of instance level queries based on the field labels, structures, and any path information to reach those structures that at least have mappings for every one of the set of one or more of the plurality of field types identified from the system level query.

8. The method of claim 4, further comprising:

classifying, according to a plurality of data categories, each of the structures represented in the result based on the field labels and field types stored for that structure;

responsive to the submission of the system level query, also determining whether any of the plurality of data categories are identifiable from the system level query; and wherein the generating the set of one or more instance level queries includes:

from each of the query graphs, generating one of the set of instance level queries based on the field labels, structures, and any path information to reach those structure that at least include:

mappings for every one of the set of one or more of the plurality of field types identified from the system level query; and any of the plurality of data categories determined to be identifiable from the system level query.

9. The method of claim 4, wherein:

the method further comprises:

predictively generating a set of one or more predicted graphs based on a prediction that system level queries will be submitted that will involve a first of the plurality of field types determined to be mapped; and the generating the set of one or more query graphs comprises:

determining, for each of the set of one or more query graphs, whether the query graph may be based at least in part on one of the set of one or more predicted graphs.

10. The method of claim 1, wherein the attempting to classify comprises:

for each of the instances, performing the following:

connecting to the instance and identifying a set of one or more structures in the instance, including any path information to access the set of structures; and for each of the set of structures, performing the following:

determining a set of one or more of field labels for that structure; and for each of the set of field labels for that structure, attempting to determine one of the plurality of field types for that field label.

11. The method of claim 10, wherein the attempting to determine one of the plurality of field types for that field label includes one or more of the following:

attempting to match the field label to one of the field labels in existing sets of one or more field labels, wherein each of the existing sets was previously assigned a respective one of the plurality of field types; and attempting data interrogation.

12. The method of claim 11, wherein the attempting to match the field label includes one or more of the following:

attempting a strict match of the field label to one of the field labels in the existing sets of one or more field labels; and attempting a fuzzy match of the field label to one of the field labels in the existing sets of one or more field labels.

13. The method of claim 11, wherein the attempting data interrogation comprises:

accessing sample data associated with the field label in the structure; and attempting to determine one of the plurality of field types from that sample data based on regexes for respective ones of the plurality of field types.

14. A non-transitory machine-readable storage medium that provide instructions, which when executed, are configurable to cause a machine to perform operations comprising:

attempting to classify, according to a plurality of field types, label fields used by structures in instances of different log data source types, wherein the different log data source types use different structure types and different path information to access the structures of those structure types within the instances, wherein each of the instances includes at least one structure, wherein each of the structures includes at least one of the label fields and at least one data field associated with the at least one of the label fields, wherein the label fields store field labels descriptive of the associated data fields;

responsive to submission of a system level query, generating a set of one or more instance level queries based on a result of the attempting and a set of one or more of the plurality of field types involved in the system level query;

submitting the set of one or more instance level queries to a set of one or more of the instances;

receiving a set of one or more instance level query results responsive to the submitting; and transmitting the instance level query results as a response to the submission of the system level query.

15. The non-transitory machine-readable storage medium of claim 14, wherein the result comprises for each instance, an instance graph with the path information and mappings for a set of one or more of the structures in that instance.

16. The non-transitory machine-readable storage medium of claim 14, the operations further comprising:

parsing the system level query to identify a set of one or more items, wherein the items include at least:

one of the field labels;

one of the plurality of field types;

data; or a combination of one of the field labels, a condition, and data; and for each of the items that does not include one of the plurality of field types, performing the following:

attempting to determine one of the plurality of field types for the item; and when the item includes one of the plurality of field types or one of the plurality of field types was determined for the item, adding that field type to the set of field types for the system level query.

17. The non-transitory machine-readable storage medium of claim 14, wherein the generating the set of one or more instance level queries comprises:

generating a set of one or more query graphs based on the set of one or more of the plurality of field types and the result, wherein the set of one or more query graphs identify those of the field labels determined to be mapped to one of the set of one or more of the plurality of field types, those of the structures that use those field labels, and the path information to access those structures, wherein each of the set of one or more query graphs is for one of the instances.

18. The non-transitory machine-readable storage medium of claim 17, wherein the generating the set of one or more instance level queries comprises:

as part of generating each of the set of query graphs:

generating an initial query graph for each of the field labels in the set of field labels determined to be included in the instance for which the query graph is being generated, wherein each of the initial query graph includes:

a field node that includes a mapping of one of the field labels to one of the set of one or more of the plurality of field types;

a set of one or more structure nodes representing a respective set of one or more of the structures that are in the instance and that include the one of the field labels, wherein the set of structure nodes depend on the field node; and any path nodes needed to identify path information to reach the set of structures in the instance for which the query graph is being generated; and when there is more than one initial query graph for the instance for which the query graph is being generated, merging the initial query graphs to form the query graph.

19. The non-transitory machine-readable storage medium of claim 18, wherein the generating the set of one or more instance level queries comprises:

for at least one of the structure nodes from which depends a set of one or more field nodes representing mappings for every one of the set of one or more of the plurality of field types identified from the system level query, generating one of the set of instance level queries based on the set of field nodes, the at least one structure node of the structure nodes, and any path information in any path nodes on which the structure node depends directly or indirectly.

20. The non-transitory machine-readable storage medium of claim 17, wherein the generating the set of one or more instance level queries comprises:

from each of the query graphs, generating one of the set of instance level queries based on the field labels, structures, and any path information to reach those structures that at least have mappings for every one of the set of one or more of the plurality of field types identified from the system level query.

21. The non-transitory machine-readable storage medium of claim 17, the operations further comprising:

classifying, according to a plurality of data categories, each of the structures represented in the result based on the field labels and field types stored for that structure;

responsive to the submission of the system level query, also determining whether any of the plurality of data categories are identifiable from the system level query; and wherein the generating the set of one or more instance level queries includes:

from each of the query graphs, generating one of the set of instance level queries based on the field labels, structures, and any path information to reach those structure that at least include:

mappings for every one of the set of one or more of the plurality of field types identified from the system level query; and any of the plurality of data categories determined to be identifiable from the system level query.

22. The non-transitory machine-readable storage medium of claim 17, wherein:

the operations further comprise:

predictively generating a set of one or more predicted graphs based on a prediction that system level queries will be submitted that will involve a first of the plurality of field types determined to be mapped; and the generating the set of one or more query graphs comprises:

determining, for each of the set of one or more query graphs, whether the query graph may be based at least in part on one of the set of one or more predicted graphs.

23. The non-transitory machine-readable storage medium of claim 14, wherein the attempting to classify comprises:

for each of the instances, performing the following:

connecting to the instance and identifying a set of one or more structures in the instance, including any path information to access the set of structures; and for each of the set of structures, performing the following:

determining a set of one or more of field labels for that structure; and for each of the set of field labels for that structure, attempting to determine one of the plurality of field types for that field label.

24. The non-transitory machine-readable storage medium of claim 23, wherein the attempting to determine one of the plurality of field types for that field label includes one or more of the following:

attempting to match the field label to one of the field labels in existing sets of one or more field labels, wherein each of the existing sets was previously assigned a respective one of the plurality of field types; and attempting data interrogation.

25. The non-transitory machine-readable storage medium of claim 24, wherein the attempting to match the field label includes one or more of the following:

attempting a strict match of the field label to one of the field labels in the existing sets of one or more field labels; and attempting a fuzzy match of the field label to one of the field labels in the existing sets of one or more field labels.

26. The non-transitory machine-readable storage medium of claim 24, wherein the attempting data interrogation comprises:

accessing sample data associated with the field label in the structure; and attempting to determine one of the plurality of field types from that sample data based on regexes for respective ones of the plurality of field types.

* * * * *